United States Patent
Shreepriya et al.

(10) Patent No.: US 11,940,282 B2
(45) Date of Patent: Mar. 26, 2024

(54) APPARATUS AND METHOD FOR HYBRID NAVIGATION OF A PEDESTRIAN TOUR

(71) Applicant: Naver Corporation, Gyeonggi-do (KR)

(72) Inventors: Shreepriya Shreepriya, Grenoble (FR); Danilo Gallo, Grenoble (FR); Jutta Willamowski, Grenoble (FR)

(73) Assignee: Naver Corporation (KR)

(*) Notice: Subject to any disclaimer, the term of this patent is extended or adjusted under 35 U.S.C. 154(b) by 0 days.

(21) Appl. No.: 17/407,488

(22) Filed: Aug. 20, 2021

(65) Prior Publication Data
US 2022/0113143 A1    Apr. 14, 2022

Related U.S. Application Data

(60) Provisional application No. 63/090,340, filed on Oct. 12, 2020.

(51) Int. Cl.
    *G01C 21/34*    (2006.01)
    *G01C 21/36*    (2006.01)

(52) U.S. Cl.
    CPC ....... *G01C 21/343* (2013.01); *G01C 21/3415* (2013.01); *G01C 21/362* (2013.01);
    (Continued)

(58) Field of Classification Search
    CPC .......... G01C 21/343; G01C 21/3415; G01C 21/362; G01C 21/3629; G01C 21/3652; G01C 21/367
    See application file for complete search history.

(56) References Cited

U.S. PATENT DOCUMENTS

| | | | | |
|---|---|---|---|---|
| 5,760,771 A | * | 6/1998 | Blonder | G06F 16/954 705/26.1 |
| 6,636,803 B1 | * | 10/2003 | Hartz, Jr | G06Q 50/16 701/454 |

(Continued)

FOREIGN PATENT DOCUMENTS

| | | | | |
|---|---|---|---|---|
| GB | 2580926 | * | 1/2019 | |
| GB | 2580926 | * | 8/2020 | ............. G01C 21/34 |

OTHER PUBLICATIONS

Gallo, Danilo; Shreepriya Shreepriya; and Willamowski, Jutta. "RunAhead: Exploring Head Scanning Based Navigation for Runners". In Proceedings of the 2020 CHI Conference on Human Factors in Computing Systems, pp. 1-13. Honolulu HI USA: ACM, 2020.

(Continued)

*Primary Examiner* — Vivek D Koppikar
*Assistant Examiner* — Godgrey Aleksander Maciorowski

(57) ABSTRACT

There is provided an apparatus for navigating a pedestrian tour including a processor circuit, a memory and a screen. The pedestrian tour includes a starting point, a first pedestrian tour zone and a second pedestrian tour zone, all of which are connected by a series of connecting paths. First and second suggested travel constraints, corresponding respectively with the first and second pedestrian tour zones, are stored in the memory. Responsive to determining that the pedestrian's actual travel within the first pedestrian tour zone will vary from the first suggested travel constraint, the processor circuit dynamically revises the second suggested travel constraint to permit the pedestrian user to execute the pedestrian tour in accordance with a preset target travel constraint for the pedestrian tour. There is also provided a hybrid navigation method in which the processor circuit is used to operatively associate at least one of the pedestrian tour zones with a first guidance system and at least one of the (Continued)

connecting paths with a second guidance system. The first guidance system provides the pedestrian user with minimal or no navigation information when the pedestrian user is using the at least one pedestrian tour zone and the second guidance system provides the pedestrian with detailed geographic map instructions when the pedestrian user is using one of the connecting paths.

**27 Claims, 20 Drawing Sheets
(17 of 20 Drawing Sheet(s) Filed in Color)**

(52) U.S. Cl.
CPC ..... *G01C 21/3629* (2013.01); *G01C 21/3652* (2013.01); *G01C 21/367* (2013.01)

(56) References Cited

U.S. PATENT DOCUMENTS

| | | | | |
|---|---|---|---|---|
| 2005/0114190 | A1* | 5/2005 | Pandit | G06Q 10/06316 705/7.26 |
| 2008/0033641 | A1* | 2/2008 | Medalia | G06F 3/04815 701/533 |
| 2010/0094543 | A1* | 4/2010 | Friedenthal | G01C 21/343 707/E17.014 |
| 2014/0107916 | A1 | 4/2014 | Urup et al. | |
| 2016/0132567 | A1* | 5/2016 | Dole | G06F 16/93 707/722 |
| 2016/0216115 | A1 | 7/2016 | Forutanpour et al. | |
| 2020/0309545 | A1* | 10/2020 | Michel | H04W 4/024 |
| 2021/0102819 | A1 | 4/2021 | Gallo et al. | |
| 2021/0381840 | A1* | 12/2021 | Viswanathan | G09G 5/37 |

OTHER PUBLICATIONS

Holland, Simon; Morse, David R.; and Gedenryd, Henrick. "AudioGPS: Spatial Audio Navigation with a Minimal Attention interface". Springer-Verlag London Ltd, Personal Ubiquitous Computing, 6:253-259, Jan. 2002.

Loepp, Benedikt; and Ziegler, Jürgen. "Recommending Running Routes: Framework and Demonstrator", ComplexRec 2018, Second Workshop on Recommendation in Complex Scenarios, Vancouver, Canada, Oct. 7, 2018.

McGookin, David K.; and Brewster, Stephen A. "Investigating and Supporting Undirected Navigation for Runners". In CHI '13 Extended Abstracts on Human Factors in Computing Systems on—CHI EA '13, pp. 1395-1400, Paris, France: ACM Press, 2013.

Mcgookin, David; Gkatzia, Dimitra; and Hastie, Helen. "Exploratory Navigation for Runners Through Geographic Area Classification with Crowd-Sourced Data". In Proceedings of the 17th International Conference on Human-Computer Interaction with Mobile Devices and Services—MobileHCI '15, pp. 357-361. Copenhagen, Denmark: ACM Press, 2015.

Mercier, Damien. "Pleasant Tour Finder: an application to find the most pleasant tour from a given location". Ecole Polytechnique de Louvain, Université catholique de Louvain, available on the Internet at hdl.handle.net/2078.1/thesis: 4598, 2016.

Strachan, Steven; Eslambolchilar, Parisa; Murray-Smith, Roderick; Hughes, Stephen; and O'Modhrain, Sile. "GpsTunes: Controlling Navigation via Audio Feedback". In Proceedings of the 7th International Conference on Human Computer Interaction with Mobile Devices & Services—MobileHCI '05, pp. 275-278, Salzburg, Austria: ACM Press, 2005.

Viswanathan, Sruthi; Boulard, Cecile; and Grasso, Antonietta Maria. "Ageing Clouds: Novel yet Natural Support for Urban Exploration". In DIS '19 Companion Publication of the 2019 on Designing Interactive Systems Conference Jun. 23-28, 2019, pp. 313-317, San Diego, CA, USA: ACM Press, 2019.

Warren, Nigel; Jones, Matt; Jones, Steve; and Bainbridge, David. "Navigation via Continuously Adapted Music". In CHI '05 Extended Abstracts on Human Factors in Computing Systems—CHI '05, pp. 1849-1852, Apr. 2-7, 2005, Portland, OR, USA, ACM Press, 2005.

Web page: "Strava, Run and Cycling Tracking on the Social Network for Athletes; the #1 app for runners and cyclists," available on the Internet at www.strava.com, 2020.

\* cited by examiner

APPARATUS AND METHOD FOR HYBRID NAVIGATION OF A PEDESTRIAN TOUR

PRIORITY INFORMATION

The present application claims priority, under 35 USC § 119(e), from U.S. Provisional Patent Application, Ser. No. 63/090,340, filed on Oct. 12, 2020. The entire content of U.S. Provisional Patent Application, Ser. No. 63/090,340, filed on Oct. 12, 2020, is hereby incorporated by reference.

FIELD

The presented disclosure generally relates to a hybrid navigation system implemented on an apparatus including a user interface. The system is used cooperatively with various hardware and software components, such as a computer, a network and a distance determining system, to provide a visual representation corresponding with a pedestrian tour, on the user interface. The visual representation provides a walker or runner ("pedestrian") with detailed geographic map guidance ("turn-by-turn directions") outside of one or more pedestrian tour zones and flexible navigation guidance within each of the pedestrian zones. Additionally, dynamic adaptation of a suggested travel constraint can be performed for one or more of the pedestrian tour zones to accommodate for the pedestrian exceeding or failing to reach a suggested travel constraint for another pedestrian tour zone.

BACKGROUND

Even in unknown environments, pedestrians desire to exercise and enjoy their run or walk in an unfamiliar geographic zone or neighborhood without the fear of getting lost. Several approaches have been previously proposed for providing pedestrian tours.

In one existing approach, a pedestrian is provided with a fully planned walking/running tour including turn-by-turn navigational support (i.e., detailed geographic map directions). In this approach, the walking tour is defined by both a target length and one or more paths specified in terms of geographical directions. This approach, while quite useful in providing a pedestrian with a specific plan for walking or running, lacks the flexibility that at least some pedestrians desire. That is, defining a pedestrian tour strictly in terms of turn-by-turn navigation support may very well be perceived as unpleasant and disruptive by a pedestrian who may not wish to strictly follow a fully planned tour in detail from start to end.

In another existing approach, the runnability of a specific geographical zone is assessed, and corresponding runnability values are displayed, by way of a visualization, to apprise a pedestrian of the runnability of the specific geographical zone. While the visualization serves to provide the pedestrian with flexible navigation support within the specific geographical zone, it does not provide any pre-planned itineraries. Consequently, obtaining navigational support for moving to and from the specific geographic zone is left up to the pedestrian.

In yet another existing approach navigation solutions, using, for instance, spatial audio, stereo effect and bearing information, implicitly guide pedestrians. While this existing approach supports more flexible navigation support, it does not appear to change and/or adapt to the user's situation. For instance, this approach does not appear to dynamically change and/or adapt the level of navigation based on the environment and situation encountered by the pedestrian.

In one proposed approach, a flexible pedestrian tour is generated by augmenting an initially generated fully specified running tour in a subsequent step with one or more possible alternative paths. However, in this proposed approach, the pedestrian tour is not generated with the aim of including a geographic zone that the pedestrian can explore freely, and there is no guarantee that a significant number of alternative paths will be available within the zone.

In another proposed approach, a visualization for promoting exploration of a given urban area is provided. Displaying a geographic map on the display of a handheld device, urban zones including points of interest are shown on the display in the form of clouds. The visualization is further provided with representations of paths illustrating the how the clouds are geographically connected. In practice, when a pedestrian physically visits one of the urban zones including points of interest, the associated cloud changes from one color to another (i.e., the cloud "ages") for indicating that at least a part of the urban zone including points of interest has been explored by the pedestrian.

Even though the aging cloud scheme provides a desirable mechanism for unconstrained exploration of an urban area, it lacks some of features that are important to serious walkers or runner. First, the aging cloud scheme does not provide a specific tour with a corresponding travel constraint. Consequently, there is no need to track the progress of a pedestrian against a total travel constraint set for the tour. Second, while the visualization for the aging cloud scheme includes connecting paths which are useful in generally directing a pedestrian from one cloud to another, such connecting paths do not appear to provide a pedestrian with detailed geographic map instructions. Third, the urban zones in the aging cloud scheme are selected based on points of interest as opposed to the extent to which they are walkable or runnable. Finally, feedback, warning a pedestrian user that he is about to leave an area corresponding with a cloud, is not provided.

Further improvements in generating a pedestrian tour balancing a fully planned walking/running tour (including turn-by-turn navigational support) with unconstrained exploration (where navigational support is minimized) would be desirable.

SUMMARY

In a first embodiment there is disclosed an apparatus for navigating a pedestrian tour in a selected geographical zone on a geographic map. The apparatus includes: a processor circuit; a memory, communicating with the processor circuit, for storing a preset target distance for the pedestrian tour; a screen communicating with the processor circuit, the processor circuit causing a plurality of user interface elements, representative of portions of the selected geographical zone, to be displayed on the screen; wherein the plurality of user interface elements respectively represent a starting point, a first pedestrian tour zone, a second pedestrian tour zone and a series of connecting paths, and wherein the series of connecting paths is displayed on the screen as connecting all of the starting point, the first pedestrian tour zone and the second pedestrian tour zone into the pedestrian tour; wherein the processor circuit is used to store first and second suggested travel constraints in the memory with the first suggested travel constraint corresponding with the first pedestrian tour zone and the second suggested travel constraint corresponding with the second pedestrian tour zone; a navigation module, communicating with the processor circuit, for assessing an extent to which a pedestrian user has executed the pedestrian tour within the first pedestrian tour zone; and wherein, responsive to the navigation module determining that the pedestrian's actual travel within the first pedestrian tour zone will vary from the first suggested travel constraint, the processor circuit dynamically revises the second suggested travel constraint for permitting the pedestrian user to execute the pedestrian tour in accordance with a preset target travel constraint for the pedestrian tour.

In one example of the first embodiment, the travel constraint is distance or time. In another example of the first embodiment, the variation includes exceeding the first suggested travel constraint, wherein the dynamic revising includes dynamically decreasing the second suggested travel constraint. In yet another example of the first embodiment in which the variation includes leaving the first pedestrian tour zone before reaching the first suggested travel constraint, the dynamic revising includes dynamically increasing the second suggested travel constraint.

In yet another example of the first embodiment, as the dynamically revised second suggested travel constraint approaches a selected value, the pedestrian is warned that the user interface element representative of second pedestrian tour zone will be eliminated from the screen when the revised second suggested travel constraint falls below the selected value. In yet another example of the first embodiment in which the revised second suggested travel constraint drops below the selected value, the second pedestrian tour zone is eliminated from the pedestrian tour.

In yet another example of the first embodiment in which, prior to the pedestrian user touring in the first or second pedestrian tour zone, each of the user interface elements representative of the first and second pedestrian tour zones is displayed on the screen in a first color, wherein, when the revised second suggested travel constraint drops below the selected value, the color of the user interface element representative of the second pedestrian tour zone changes to a second color to indicate that the second pedestrian tour zone has been eliminated from the pedestrian tour. In yet another example of the first embodiment in which, prior to the pedestrian user touring the first pedestrian tour zone, the user interface element representative of the first pedestrian tour zone is displayed on the screen in a first color, wherein, as the pedestrian user tours the first pedestrian tour zone, the first color changes, in appearance on the screen, to a second color to indicate an extent to which the pedestrian user has toured the first pedestrian tour zone.

In yet another example of the first embodiment, (a) the plurality of user interface elements includes a user interface element representative of a third pedestrian tour zone, (b) the series of paths is displayed on the screen as connecting all of the starting point, the first pedestrian tour zone, the second pedestrian tour zone and the third pedestrian tour zone into the pedestrian tour, and (c) when the travel constraint of the first pedestrian tour zone exceeds a selected value, one of the second and third pedestrian tour zones is eliminated from the pedestrian tour. In yet another example of the first embodiment, the processor circuit is used to store a third suggested travel constraint in the memory with the third suggested travel constraint corresponding with the third pedestrian tour zone, and, responsive to eliminating one of the second and third pedestrian tour zones from the pedestrian tour zone, at least some of the second travel constraint is distributed to the third pedestrian tour zone or at least some of the third travel constraint is distributed to the second pedestrian tour zone.

In yet another example of the first embodiment, the processor circuit is used to store a third suggested travel constraint in the memory with the third suggested travel constraint corresponding with the third pedestrian tour zone, and, responsive to the navigation module determining that the pedestrian's actual travel within the first pedestrian tour zone will vary from the first suggested travel constraint, the processor circuit dynamically revises both the first and second suggested travel constraints. In yet another example of the first embodiment in which the selected value comprises a first selected value, when the first travel constraint exceeds a second selected value, the pedestrian user is directed, by way of a message from the apparatus, to return to the starting point. In yet another example of the first embodiment, respective priorities are assigned to the second and third pedestrian tour zones with the priority of the third pedestrian zone being greater than the priority of the second pedestrian zone, and, responsive to both the priority of the third pedestrian tour zone being greater than the priority of the second pedestrian tour zone and the travel constraint of the first pedestrian zone exceeding the selected value, the second pedestrian tour zone is eliminated from the pedestrian tour.

In yet another example of the first embodiment in which each one of the user interface elements representative of the first, second and third pedestrian tour zones is displayed as having a first color, when the second pedestrian tour zone is eliminated from the pedestrian tour, the user interface element representative of the second pedestrian tour zone changes from the first color to a second color. In yet another example of the first embodiment, the third pedestrian tour zone is added to the pedestrian tour in response to a request from the pedestrian to change the pedestrian tour. In yet another example of the first embodiment, responsive to the second pedestrian tour zone being eliminated from the pedestrian tour, the user interface element representative of the series of connecting paths displayed on the screen is remapped by the processor circuit so that the series of connecting paths connects all of the starting point, the first pedestrian tour zone and the third pedestrian tour zone, but not the second pedestrian tour zone.

In yet another example of the first embodiment, responsive to a request by the pedestrian user, one of the first and second travel constraints is increased or decreased in value. In yet another example of the first embodiment, the first pedestrian tour zone is operatively associated with a first guidance system module with the first guidance system module providing the pedestrian user with minimal or no navigation information while the pedestrian user is determined to be in the pedestrian tour zone unless additional navigation from the first guidance system is requested (by the pedestrian user) or required (as determined by the first guidance system module); and each connecting path is operatively associated with a second guidance system module, with the second guidance system module providing the pedestrian user with detailed geographic map instructions demonstrating how the pedestrian user is to access (a) the first pedestrian tour zone from the starting location, (b) the second pedestrian tour zone from the first pedestrian tour zone and (c) the starting point from the second pedestrian tour zone.

In yet another example of the first embodiment, selected feedback regarding the pedestrian user's progress relative to executing the pedestrian tour is provided to the pedestrian user with the apparatus. In yet another example of the first embodiment, the selected feedback is provided by way of a visual representation on the screen. In another example of the first embodiment, the feedback includes audio or haptic feedback.

In a second embodiment there is disclosed a computer implemented, hybrid navigation method for use by a pedestrian user pursuant to executing a pedestrian tour. The hybrid navigation method includes: using a processor circuit to designate a starting location on a representation of a geographic map, the representation of the geographic map including a representation of a geographic zone with the representation of the geographic zone including a graph; wherein the graph includes walkable/runnable edges with each walkable/runnable edge being associated with a walkability/runnability score; using the processor circuit to select at least one pedestrian tour zone in the neighborhood, the selecting including determining how many of the walkable/runnable edges have a score exceeding a selected threshold; using the processor circuit to operatively associate the at least one pedestrian tour zone with a first guidance system, wherein the first guidance system is configured to provide through a user interface a pedestrian user with minimal or no navigation information when the pedestrian is walking or running in the at least one pedestrian tour zone unless the pedestrian requests or requires additional navigation; and using the processor circuit to operatively associate a connecting path representation extending between the starting location and the at least one pedestrian tour zone with a second guidance system, wherein the second guidance system is configured to provide through the user interface the pedestrian user with detailed geographic map instructions regarding how the pedestrian user is to access the at least one pedestrian tour zone from the starting location.

In one example of the second embodiment, selection of the at least one pedestrian zone by the processor circuit includes dividing the graph into a plurality of subgraphs and selecting the at least one pedestrian tour zone from the plurality of subgraphs. In another example of the second embodiment, the method further includes eliminating at least one of the plurality of subgraphs from consideration as including the at least pedestrian tour zone because the at least one of the plurality of subgraphs fails to one of (a) cover a threshold accumulated distance (D), (b) cover a threshold geographic area (A), and possess a sufficient density (D/A). In yet another example of the second embodiment, the method further includes determining that two or more of the plurality of subgraphs respectively include two or more pedestrian tour zones; and ranking the two or more pedestrian tour zones on the basis of walkability or runnability. In yet another example of the second embodiment, the hybrid navigation method further includes generating a pedestrian tour including the two or more subgraphs determined to respectively include two or more pedestrian tour zones; and scheduling an order in which the pedestrian user is to visit two or more subgraphs determined to respectively include two or more pedestrian tour zones based on the ranking.

In yet another example of the second embodiment, the hybrid navigation method further includes using the processor circuit to arrange the walkable/runnable edges, for at least one of the plurality of subgraphs including the at least one pedestrian tour zone, into a pedestrian tour bounding path. In yet another example of the second embodiment, the at least one of the plurality of subgraphs including the at least one pedestrian tour zone has an area boundary, wherein the pedestrian tour bounding path both surrounds the at least one pedestrian tour zone and is surrounded by the area boundary. In yet another example of the second embodiment in which at least one walkable/runnable edge is disposed between the area boundary and the pedestrian tour bounding path, the at least one walkable/runnable edge disposed between the area boundary and the pedestrian tour bounding path serves as one of an entrance to or exit from the at least one pedestrian tour zone. In yet another example of the second disclosed embodiment, when the pedestrian user approaches the at least one walkable/runnable edge serving as an entrance, the processor circuit deactivates the second guidance system. In yet another example of the second disclosed embodiment, when the pedestrian user approaches the at least one walkable/runnable edge serving as an exit, the processor circuit activates the second guidance system.

In yet another example of the second embodiment, pursuant to both the pedestrian user walking or running within the at least one pedestrian tour zone and a selected event occurring, the second guidance system is activated for directing the pedestrian user to the at least one walkable/runnable edge disposed between the area boundary and the pedestrian tour bounding path. In yet another example of the second embodiment in which the pedestrian user is scheduled to walk or run for a selected travel constraint within the at least one pedestrian tour zone, the selected event occurs when the pedestrian user reaches the travel constraint.

In yet another example of the second embodiment in which at least one of the plurality of subgraphs includes both the at least one pedestrian tour zone and at least one sub-zone, the hybrid navigation method further includes using the processor circuit to both identify the at least one sub-zone and to eliminate the at least one sub-zone from consideration as part of the at least one pedestrian tour zone. In yet another example of the second embodiment, the hybrid navigation method further includes using a mobile device to provide selected feedback to the pedestrian user with respect to the pedestrian user's progress relative to executing the pedestrian tour. In yet another example of the second embodiment in which the mobile device includes a screen with a user interface display, the hybrid navigation method further includes using the mobile phone to display on the user interface the detailed geographic map instructions on the screen. In yet another example in which the mobile device includes an audio or haptic subsystem, the hybrid navigation method further includes using the audio or haptic subsystem to provide selected feedback to the pedestrian user with respect to the pedestrian user's progress relative to executing the pedestrian tour.

DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

In the drawings, reference numbers may be reused to identify similar and/or identical elements.

DETAILED DESCRIPTION

1. System Architecture

It should be appreciated that the disclosed embodiments can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over communication links. Applications, software programs or computer readable instructions may be referred to as components or modules. Applications may take the form of software executing on a general-purpose computer or be hardwired or hard coded in hardware. Applications may also be downloaded in whole or in part through the use of a software development kit, framework, or toolkit that enables the creation and implementation of the disclosed embodiments. In general, the order of the steps of disclosed processes may be altered within the scope of the disclosed embodiments.

As used herein, the term "client computer" refers to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

Figure 1:
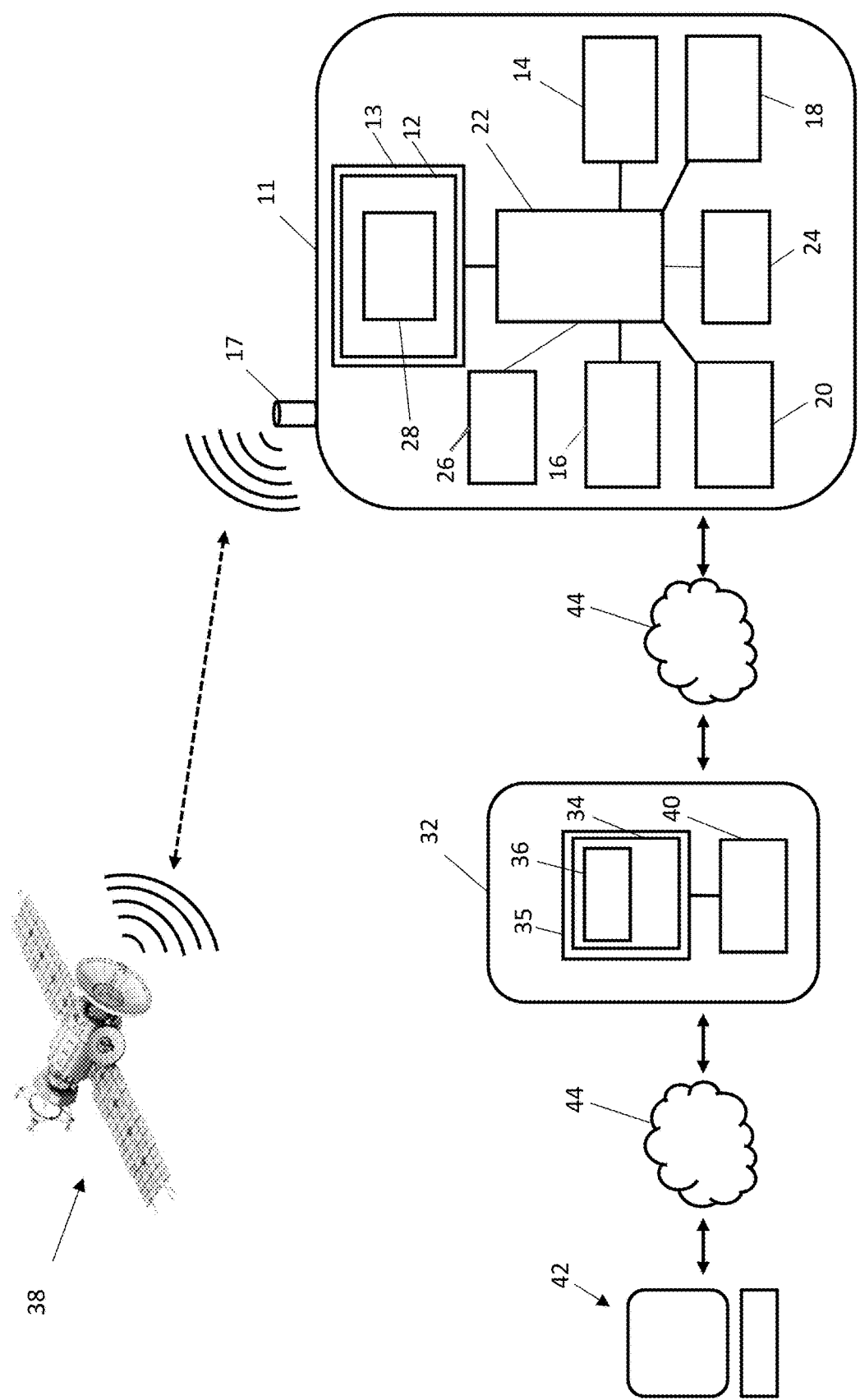
FIG. 1 illustrates a schematic, diagrammatic drawing of a networked system including a mobile device, server and client computer.

Referring to FIG. 1, a block diagram of a system architecture in which a mobile device 11 may operate is illustrated. As will be appreciated by those skilled in the art, a "mobile device" can assume one of many forms including, for instance a smart phone or watch. The mobile device 11 in this embodiment includes: an operating system 12, an input device 14, a radio frequency transceiver(s) 16, an antenna 17, a visual display or screen 18, and a battery or power supply 20. Each of these components is coupled to a processor circuit 22. The mobile device 11 further includes a GPS communications interface 24 and a programmable digital timer 26, the significance of which interface 24 and timer 26 will appear below. The device operating system 12 runs on the processor circuit 22 and enables interaction between application programs and the mobile device hardware components.

The term processor circuit, as used herein, may encompass a single processor circuit or multiple processor circuits that executes some or all computer readable instructions or computer program code from multiple modules. A client computer embodying the one or more processing circuits may include, but not limited to, CPUs (Central Processing Units), memory/storage devices, communication links, communication/transmitting devices, I/O devices, or any subcomponents or individual parts of one or more processing circuits, including software, firmware, hardware, or any combination or sub-combination thereof.

In the described embodiment, the mobile device 11 receives and transmits data through the antenna 17 using the RF transceiver(s) 16 which may be able to communicate via various networks, for example: Bluetooth, local area networks such as WiFi, and cellular networks such as GSM or CDMA. In addition, the disclosed embodiments may be used in conjunction with a position locating system including a GPS satellite 30 and the antenna 17. In one embodiment, location information is obtained through use of a GPS communications interface 24 in conjunction with GPS satellite 30 and antenna 17. In addition to using the communications interface 24 to obtain location information, the communications interface 24 can be used, in conjunction with the GPS satellite 30 and the antenna 17, to measure a travel constraint, such as the distance traversed by a pedestrian.

In the described embodiment, a local software component (which includes a navigation module) 28 includes an application program that is downloaded to the mobile device 11 and installed so that it integrates with the operating system 12, which are stored in a memory 13. Additionally, the local software component 28 may be device, platform or operating system specific.

With continued reference to FIG. 1, a server 32 is provided with operating system 34 and server software 36, which are stored in a memory 35 and executed on processor circuit 40. The server software 36 on the server 32 includes functionality to allow two-way communication between the server 32 and the mobile device 11, as well as two-way communication between the server 32 and a client computer 42 with such communication being implemented with network 44, which network, in one embodiment, is the Internet. The server software 36 on the server 32 may enable the client computer 42 to update information accessible by the mobile device 11, such as video information regarding a proposed pedestrian tour as well as navigation guidance for use throughout the pedestrian tour. The server software 36 also enables the mobile device 11 to communicate with the client computer 42 to deliver feedback regarding both the pedestrian's progress through the pedestrian tour as well as detailed information regarding the current configuration of the pedestrian tour.

Furthermore, the server software 36 may allow a considerable amount of detailed information regarding changes occurring during the pedestrian tour, such as changes in navigation approach, pedestrian tour zone configuration and/or travel constraints, to be transferred from the mobile device 11 to the client computer 34 and from the client computer 34 to the mobile device 11. In one embodiment, the server software 36 generates web page interface elements for display on the client computer 44, the web page interface elements providing a pedestrian user with a visualization of the pedestrian tour including a hybrid navigation approach permitting the pedestrian with a first or flexible guidance system in pedestrian tour zones and a second or directional guidance system outside of such zones. In one embodiment, the first and second flexible guidance systems are first and second guidance system modules, respectively, embodied in the navigation module forming part of the local software component 28 of the mobile device 11. Progress information regarding the pedestrian tour can be stored at the server 32 for use in dynamically altering the pedestrian tour responsive to how the pedestrian actually executes the proposed pedestrian tour.

Of course, it is understood by those of ordinary skill in the art that the functionality performed by server 32 does not necessarily have to be accomplished on a single hardware device. In this context, the term "server" may be used for referring to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality.

2. System Operation a. Overview

The following description of system operation relates to, among other things, a hybrid navigation approach for a pedestrian tour in which a pedestrian is directed, via turn-by-turn navigation (i.e., navigation based on detailed geographic map information), from a starting point to one or more pedestrian tour zones. Flexible navigation support may be provided in each of the one or more pedestrian tour zones. A travel constraint, such as distance or time, is monitored throughout the pedestrian tour so that the pedestrian user can know when he or she has reached or exceeded a selected target travel constraint (i.e., a travel constraint corresponding with the pedestrian tour as a whole). Responsive to the pedestrian's progress throughout the pedestrian tour, dynamic adaptation for the pedestrian tour, as described in detail below, may be provided.

b. Identifying Pedestrian Tour Zones in a Neighborhood

In the described embodiment of developing a pedestrian tour, a starting point, a target travel constraint (e.g., distance or time) and neighborhood (i.e., geographic zone) are selected by a pedestrian and, in turn, preferred pedestrian tour zones for the neighborhood are generated. The following description relating to FIGS. 2-11 elaborates, by way of development example, a process for identifying and selecting a preferred pedestrian tour zone in at least part of a neighborhood. While the example described below illustrates an approach for developing of one pedestrian tour zone, it follows from the description as a whole that a typical pedestrian tour would typically, at least initially, include multiple pedestrian tour zones. Moreover, while the travel constraint for the present description is distance, time could be used as the travel constraint without changing the concept upon which the disclosed embodiments are based.

Figure 2:
FIG. 2 illustrates a graph composed of walkable/runnable edges, the graph being representative of a geographic zone, such as a neighborhood.

Referring to FIG. 2, in the exemplary approach of developing a pedestrian tour zone, the identification of possible pedestrian tour zones is based on the analysis of a graph 50 representing a selected neighborhood. This graph is constructed from map data including intersections linked by path segments or edges. The graph of FIG. 2 is constructed with edges, a few of which are designated with the numeral 52.

Before identifying possible pedestrian tour zones, a scoring algorithm is applied to assign a runnability score to all the graph edges in a given geographic zone. Conventional algorithms such as those typically using factors including greenery, low-traffic and pollution level, can be used to determine a path's runnability as an average score over its distance. The better an edge is suited for running, the higher its runnability score will be. The scoring function can also be extended to include other factors. It can include for instance the edge popularity for running (if running traces are available) or other crowd sourced data. Also, temporal factors, such as the time of the day/week, specific events or weather can affect edge runnability rating. For example, some edges may have weekly markets that will affect its suitability for running. Similarly, rain may affect runnability by creating muddy paths. Finally, the presence of points of interest could be considered when assigning a runnability score.

In one example, the scoring algorithm is calculated based on Open Street Map (OSM) data and relies on complex computation methods, such as the computation of intersections of polygons to assess the environment. The score may be optimized using an external constraint programming solver (OscaR).

With continued reference to FIG. 2, threshold runnability score values for desirable, and unacceptable edges are set. Reasonable values can be selected in view of the average runnability score of a neighborhood and the distribution of the runnability score values over corresponding edges. For instance, the desirable runnability score threshold could be set such that 20% of the edges in the area have a score equal to or above a selected value and 80% of the edges in the area have a score below the selected value.

Figure 3:
FIG. 3 illustrates the graph of FIG. 2 in which the walkable/runnable edges are highlighted in accordance with runnability scores.

Referring to FIG. 3, the results for an exemplary scored graph are shown. The edges in the graph are highlighted in different colors according to their walkability or runnability level. For FIG. 3, the edges shown in green each have a score above the desired runnability score; the edges shown in red have an unacceptable runnability score; and the edges shown in orange have an acceptable runnability score (i.e., between the desired and the unacceptable runnability scores).

Figure 4:
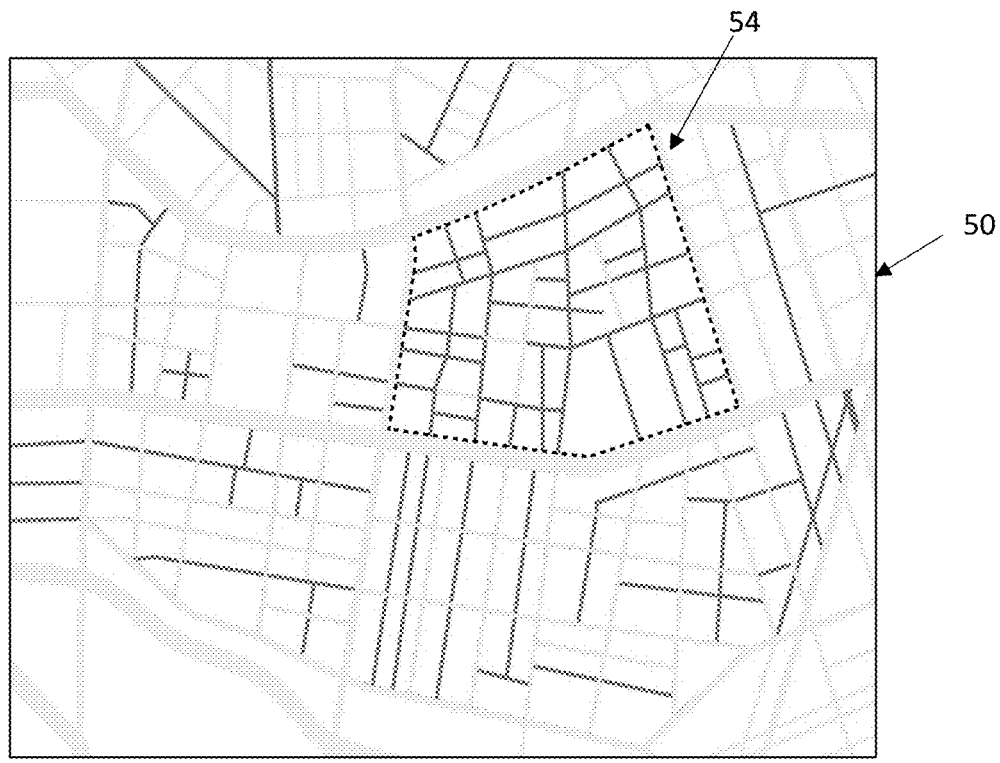
FIG. 4 illustrates the graph of FIG. 3 with all edges having either acceptable or unacceptable walkable/runnable edges being faded out.
Figure 5:
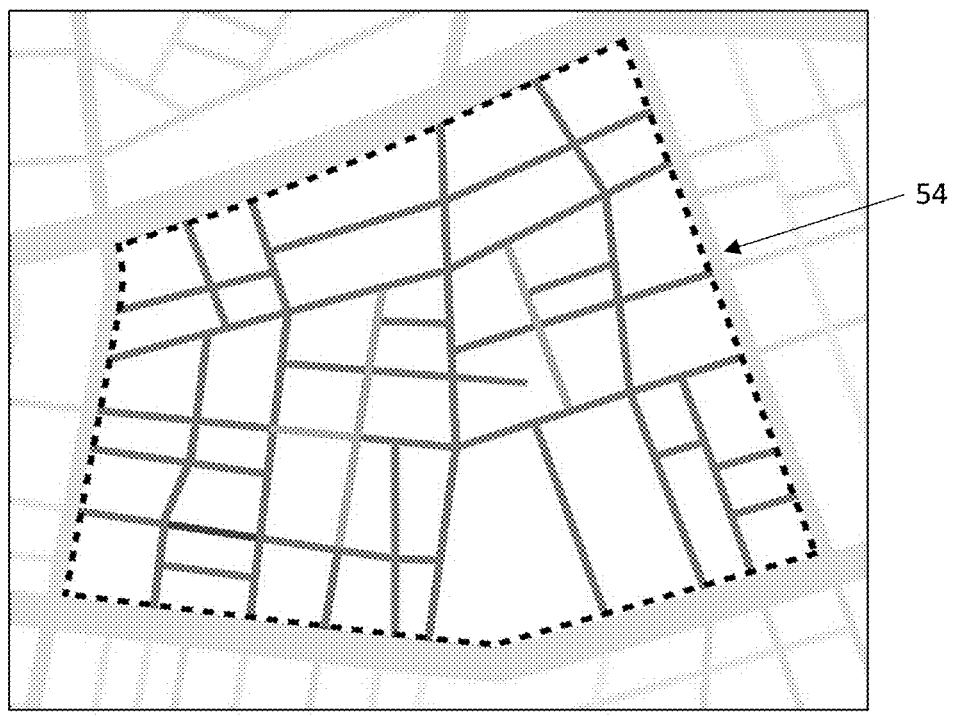
FIG. 5 illustrates a subgraph with walkable/runnable edges highlighted in accordance with runnability scores, the subgraph being suitable for use in processing a pedestrian tour zone.
Figure 6:
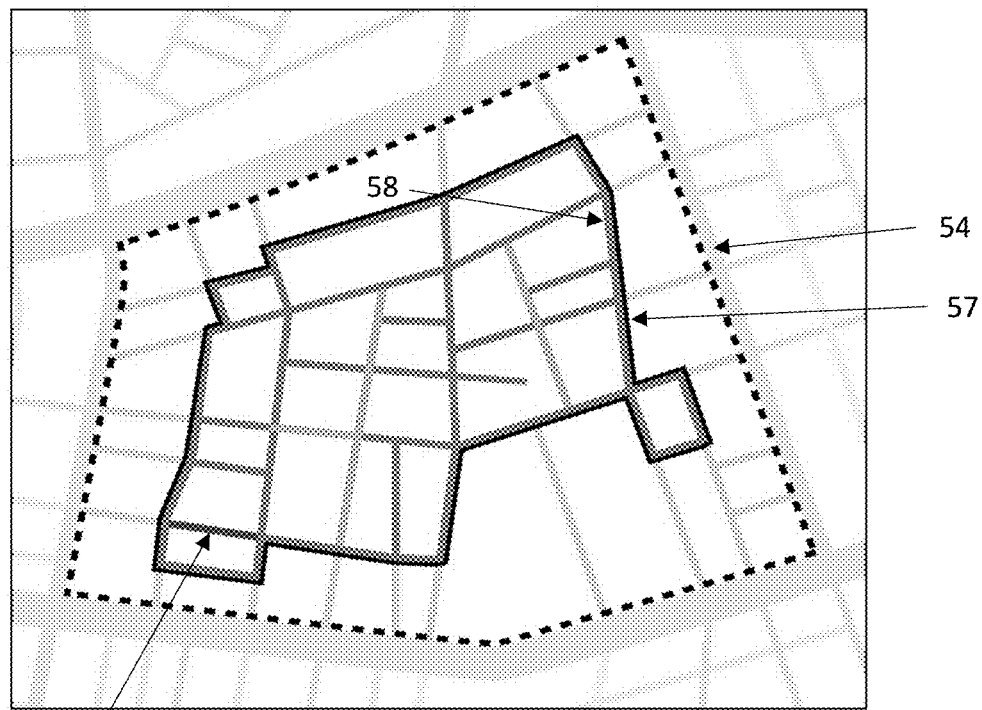
FIG. 6 illustrates the subgraph of FIG. 5 with the pedestrian tour zone being highlighted with a black border to show all of the walkable/runnable edges it contains.

In general, a scored graph, such as the scored graph 50 of FIG. 3, can be used to identify subgraphs, the identified subgraphs serving as preliminary candidate pedestrian tour zones. More particularly, FIG. 4, shows all edges 52 of the graph 50 having the desired runnability level, fading out all other edges. FIGS. 4 and 5 illustrate a subgraph 54 suitable for use in processing a pedestrian tour zone 56 (FIG. 10), the subgraph 54 being delimited by the edges surrounding it that have a lower score than the desirable runnability score. FIG. 6 highlights a candidate pedestrian tour zone 57, showing all the edges it contains, colored according to their runnability level.

With continued reference to the development example of FIG. 6, a largest inner tour for the candidate pedestrian tour zone 57 is designated by the numeral 58. To identify the largest inner tour (also referred to herein as "area boundary"), the edges leading outside that tour are removed or faded out for obtaining the candidate pedestrian tour zone 57. In the present development example, any edge with an unacceptable score within the candidate pedestrian tour zone 57 is eliminated. Accordingly, unacceptable edges and/or unacceptable sub-zones within the candidate pedestrian tour zone 57 are identified for elimination.

Figure 7:
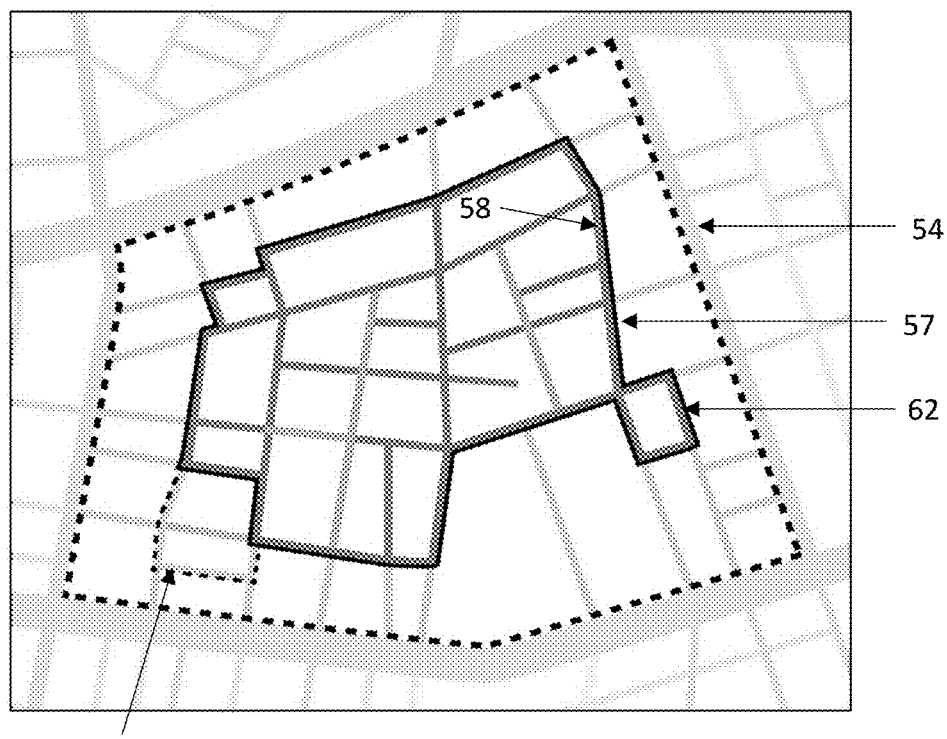
FIG. 7 illustrates the subgraph of FIG. 6 demonstrating removal of the smallest tour with an unacceptable walkable/runnable edge.

For instance, in the example of FIG. 6, the red edge 60 within the bottom left of the candidate pedestrian tour zone 57 is removed and, referring to FIG. 7, the smallest tour 61 around the red edge touching the largest inner tour 58 is cut out of the candidate pedestrian tour zone 57. In this development example, there are no other unacceptable isolated edges remaining around the largest inner tour 58.

Figure 8:
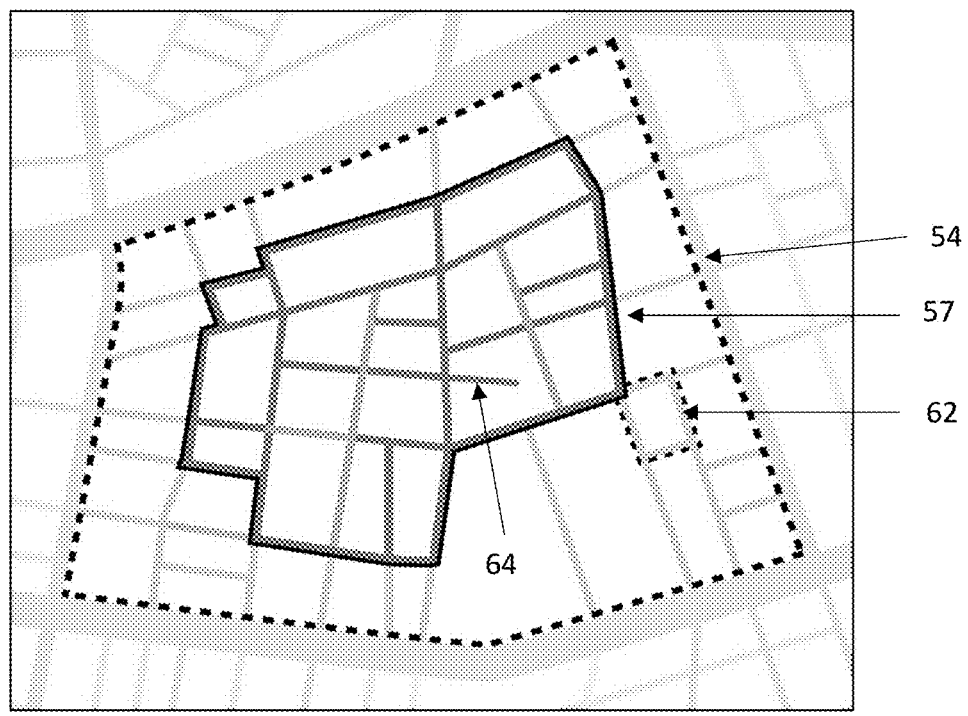
FIG. 8 illustrates the subgraph of FIG. 7 demonstrating removal of a sub-zone only connected at one location or intersection.

A candidate pedestrian tour zone may include complex shapes affecting the communication to the user (i.e., the tour display) as well as the navigation support needed to stay within the pedestrian tour zone. A post-processing step can be performed to address such cases and simplify candidate pedestrian tour zones. That is, sub-zones only connected at one location or intersection can be eliminated. To eliminate such sub-zones, the largest inner tour 58 of the candidate pedestrian tour zone 57 can be analyzed to identify intersections that separate the zone into otherwise distinct sub-zones. Each sub-zone can then be assessed independently to determine whether it should be eliminated from the candidate pedestrian tour zone 57. For instance, as illustrated in FIG. 7 the small sub-zone 62 on the bottom right can be eliminated as illustrated in FIG. 8 from the candidate pedestrian tour zone 57 since it neither covers a significant area nor proposes any alternative paths.

Figure 9:
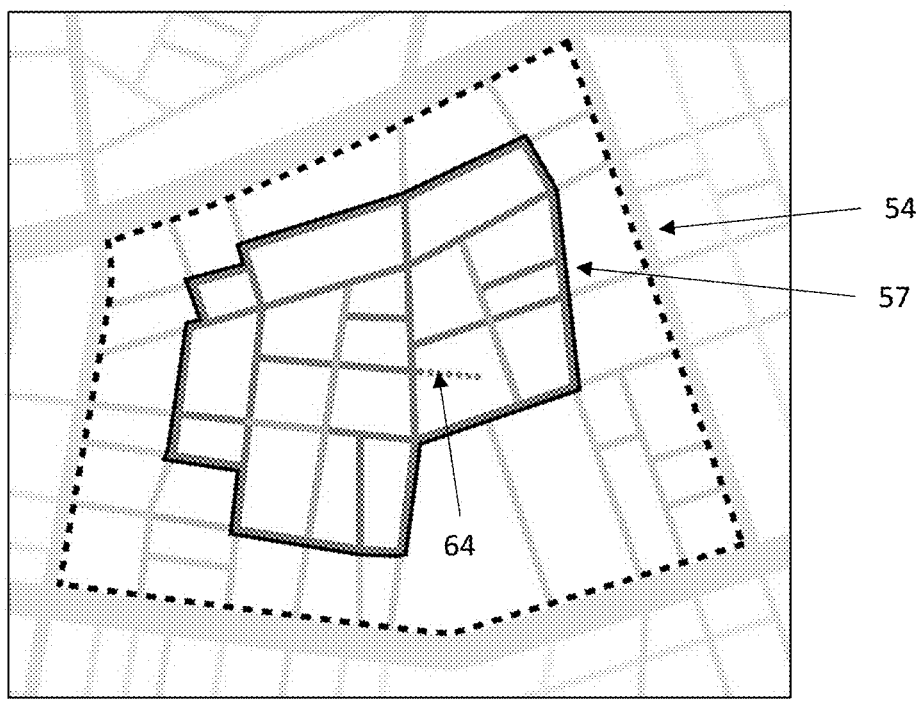
FIG. 9 illustrates the sub-graph of FIG. 8 demonstrating the removal of a walkable/runnable edge corresponding with a dead end.

Further development includes computing, for each candidate pedestrian tour zone 57, the following properties: total summed distance of all edges the pedestrian tour zone contains (Dist), the pedestrian tour zone's surface (A), the pedestrian tour zone's density (Dens [Dens=Dist/A], and the number of alternatives (Alt). To estimate Alt, each dead end is removed (i.e., each edge belonging to a path that does not permit a pedestrian to return to the corresponding subgraph except by returning on the same path). Referring to FIG. 9, the candidate pedestrian tour zone 57 contains one dead end, shown as a dashed line designated with the numeral 64.

Figure 10:
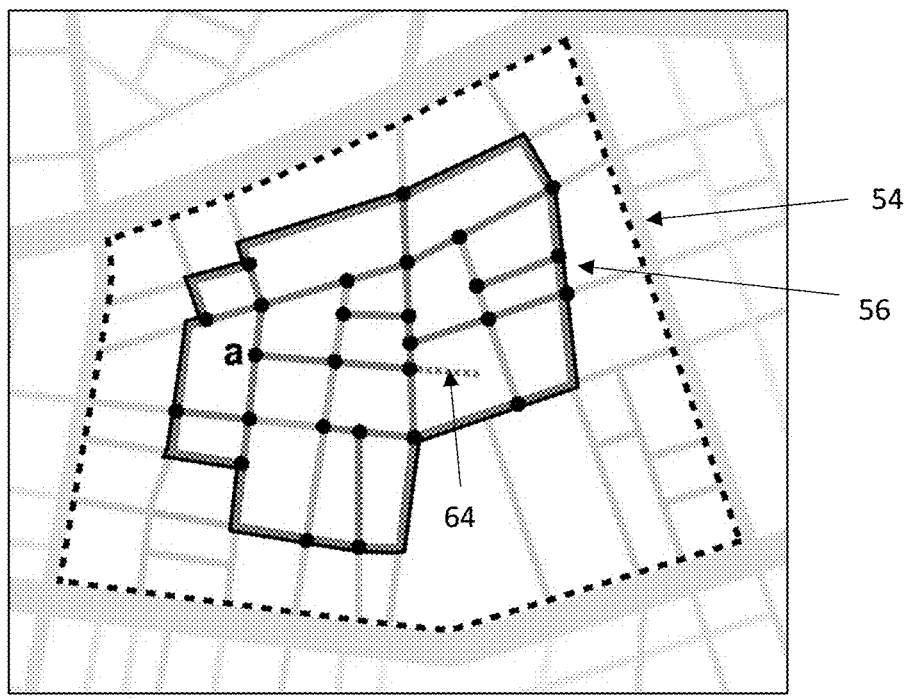
FIG. 10 illustrates the sub-graph of FIG. 9 with multiple nodes (shown as black dots) and with each node being connected to two or more walkable/runnable edges.

Referring to FIG. 10, multiple nodes (shown as highlighted black dots in pedestrian tour zone 56) connected to more than two remaining edges are identified. These are the nodes offering additional options to the pedestrian, beyond entering and exiting the intersection. Additionally, the number of additional edge options in the pedestrian tour zone 56 are counted and accumulated to obtain an indication of the value of Alt for the pedestrian tour zone. For example, the intersection 'a' in FIG. 10 is the starting point for three edges, meaning that it adds one additional edge option to this pedestrian tour zone 56.

Figure 11:
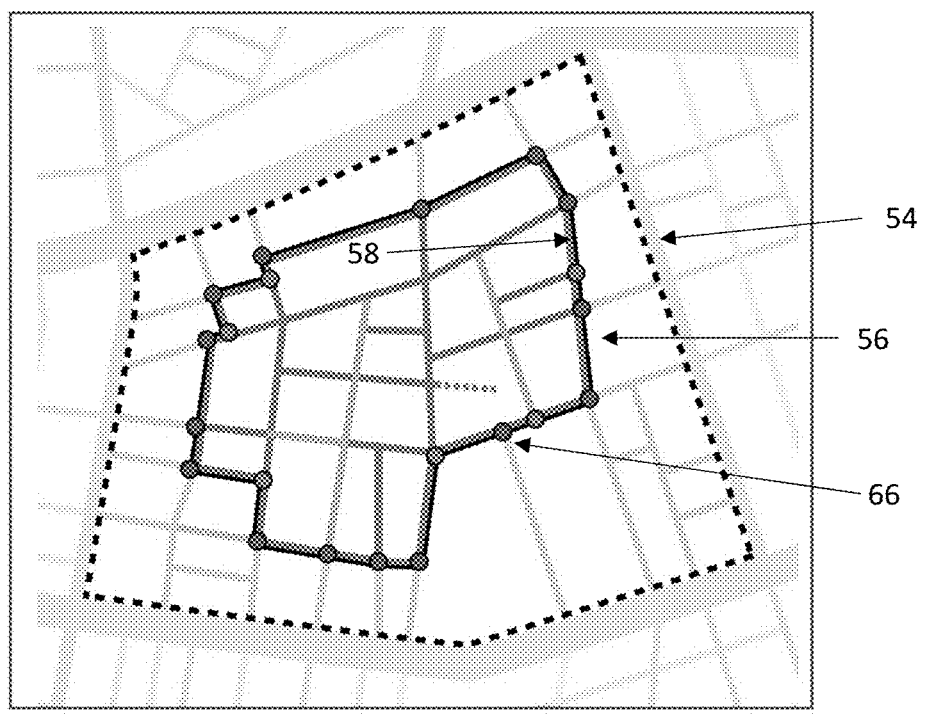
FIG. 11 illustrates the sub-graph of FIG. 9 showing a boundary of the candidate pedestrian zone, the boundary including intersections along a largest outer tour of the candidate pedestrian zone.

Referring to FIG. 11, the pedestrian tour zone 56 includes intersections (colored in lavender) on the largest inner tour 58, the intersections connecting to edges permitting a pedestrian to exit the pedestrian tour zone (i.e., connecting exit edges). One of the exit edges is designated with the numeral 66. Not all nodes or intersections on the largest inner tour 58 connect with an exit edge. That is, some of the nodes (colored blue in FIG. 11) only connect with edges that remain within the pedestrian tour zone 56 (either remaining on the inner tour or leading towards the inside of the pedestrian tour zone). In one embodiment, navigation support need only be provided for the lavender nodes, not the blue nodes. Consequently, the amount of navigation support required for a pedestrian tour zone (and thus the amount of navigation required to assist a pedestrian in remaining within the pedestrian tour zone) varies as a function of the lavender nodes that the pedestrian tour zone possesses.

In the development example, certain properties of the candidate pedestrian tour zones, such as insignificance, inhomogeneity and/or insufficient flexibility, are considered for possibly eliminating a candidate pedestrian tour zone. An insignificant zone is a candidate pedestrian tour zone that may be unworthy of exploration by a pedestrian because it either (1) fails to cover a significant accumulated distance (Dist) or geographic area A, or (2) lacks sufficient density (Dens). An inhomogeneous candidate pedestrian tour zone is a candidate zone that may contain too many edges or, more precisely, too much distance with a runnability score failing to exceed a selected runnability threshold. An insufficiently flexible candidate pedestrian tour zone is a candidate zone failing to enable a significant variety of alternative runnable tours.

Further description regarding identifying pedestrian tour zones in a neighborhood is provided in section g below.

c. Tour Generation

One embodiment accommodates for user requirements, essentially using a desired starting point and target distance to generate a flexible pedestrian tour. To enable user flexibility, not only within one pedestrian tour, but across multiple pedestrian tours, information regarding past pedestrian tours executed by experienced users, and the pedestrian tour zones they have already explored (along with the extent to which they have explored such zones) can be stored within the system architecture of FIG. 1, such as at server 32.

Thus, when generating pedestrian tours with, for instance the client computer 42, the disclosed embodiment can be advantageously used to select new pedestrian tour zones, not yet explored by a pedestrian user, as well as suitable paths for connecting pedestrian tour zones. In one example, this can be done either by penalizing the pedestrian tour zones and connecting paths already executed/explored by the pedestrian user (i.e., lowering their score) or by favoring the yet unexplored connecting paths and pedestrian tour zones (i.e., increasing their score).

Finally, the user may specify her preferences for exploration and whether she desires to explore pedestrian tour zones extensively and in detail or whether she prefers to explore each pedestrian tour zone in less detail but to explore a greater number of zones. This balance will impact the suggested distance or time to be spent in each zone and, in turn, how the pedestrian tours are generated.

Some of the following description of the embodiments may express distance as the travel constraint for a pedestrian tour. It will be understood by those skilled in the art, nonetheless, that other travel constraints, such as time could be employed without altering the operation of the described embodiments.

In selecting pedestrian tour zones for a given neighborhood, one embodiment uses an approach providing the best compromise between (1) the distance (or time) required to reach the pedestrian tour zones and to move from one pedestrian tour zone to the other, and (2) the amount of alternatives for exploration the pedestrian tour zones offer. Each insertion of a pedestrian tour zone in the pedestrian tour corresponds to inserting three elements, (1) the connecting path to reach the pedestrian tour zone (either from the starting point or from a previous pedestrian tour zone), (2) the pedestrian tour zone itself, and (3) the connecting path to leave that pedestrian tour zone (either to go to the next pedestrian tour zone or back to the starting point of the tour).

In generating a pedestrian tour, an insertion may be performed between two points, each of which can be either the starting/end point of the pedestrian tour or the entry/exit point of a pedestrian tour zone. The precise entry/exit point of a pedestrian tour zone is determined by the connecting paths, the details of which connecting paths will follow from the description below. In one example, an insertion corresponds to and is evaluated through both its accumulated distance and an accumulated score over the distance. The cumulated distance is the sum of the distance of two connecting paths and the estimated distance the pedestrian will spend within the inserted pedestrian tour zone. The accumulated score corresponds to the accumulated score of the two connecting paths over their respective distance, and the mean score of the pedestrian tour zone accumulated over (i.e., multiplied by) the estimated distance the pedestrian will spend within that zone.

Each pedestrian tour zone may be defined, using the client computer 42 (FIG. 1), by a minimal distance and a suggested distance (for exploring the zone). In one example, the minimal distance is half the distance of the largest inner tour (also referred to hereinafter as "bounding path") of a pedestrian tour zone. This minimal distance can constitute, on one hand, a minimal level of exploration. The minimal distance can, on the other hand, permit all possible pairs of intersections on the pedestrian tour zone's boundary to be connected, and thus permit the pedestrian tour zone to be inserted into any possible tour configuration.

For the suggested distance, a proportion of the remaining accumulated distance the zone covers is added to the minimal distance. This proportion may be adapted by the individual pedestrian user through his preferences or could be learned from his observed running habits. Indeed, some pedestrian users may desire to explore pedestrian tour zones more extensively than others. The manner in which suggested distance is computed impacts which and how many pedestrian tour zones can be included in a pedestrian tour.

Figure 12:
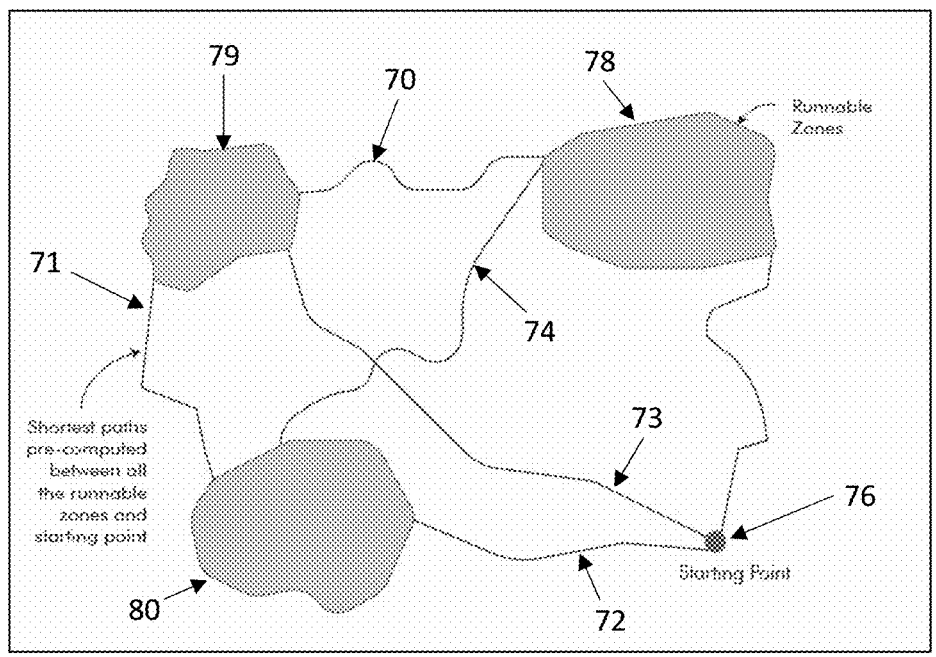
FIG. 12 illustrates a schematic, diagrammatic view of a pedestrian tour.

The system (FIG. 1) uses, for instance, the client computer 42 to pre-compute the best paths to connect pedestrian tour zones, considering both their suitability for running as well as the distance they cover. Referring to FIG. 12, the client computer 42 can be used to pre-compute the connecting paths 70-74 between the starting point 76 and all pedestrian tour zones 78-80, thus identifying the corresponding entry/exit points of the pedestrian tour zones. For instance, for each pair of the pedestrian tour zones, the shortest/best path linking the centers of both zones could be computed and the part corresponding to the exterior of these zones could be taken to define the exit node, the entrance node and connecting path.

Pursuant to generating a pedestrian tour for a pedestrian, a proposal may be made to the user via the handheld device 11 (FIG. 1) with a suggested combination of pedestrian tour zones and their connecting paths (as in, for instance FIG. 12). A pedestrian user may be provided with the option, before starting the tour, of ranking the pedestrian tour zones according to the pedestrian user's preference(s) (i.e., the priority with which the user desires to explore the pedestrian tour zones). This will allow the embodiment to both, as described in detail below, make more user-friendly decisions in case of dynamic adaptation and eliminate pedestrian tour zones as a result of encountering travel constraints.

d. Dynamic Tour Adaptation

As described above, a pedestrian tour generated pursuant to one embodiment corresponds with a sequence of pedestrian tour zones being connected through a series of best paths. The embodiment generates a pedestrian tour such that its estimated total travel constraint (e.g., distance) corresponds to the user's desired target travel constraint for the pedestrian tour; this total travel constraint corresponding with an estimated accumulation of travel constraints for all of the connecting paths to be used for the pedestrian tour as well all the suggested travel constraints for all included pedestrian tour zones.

Figure 13:
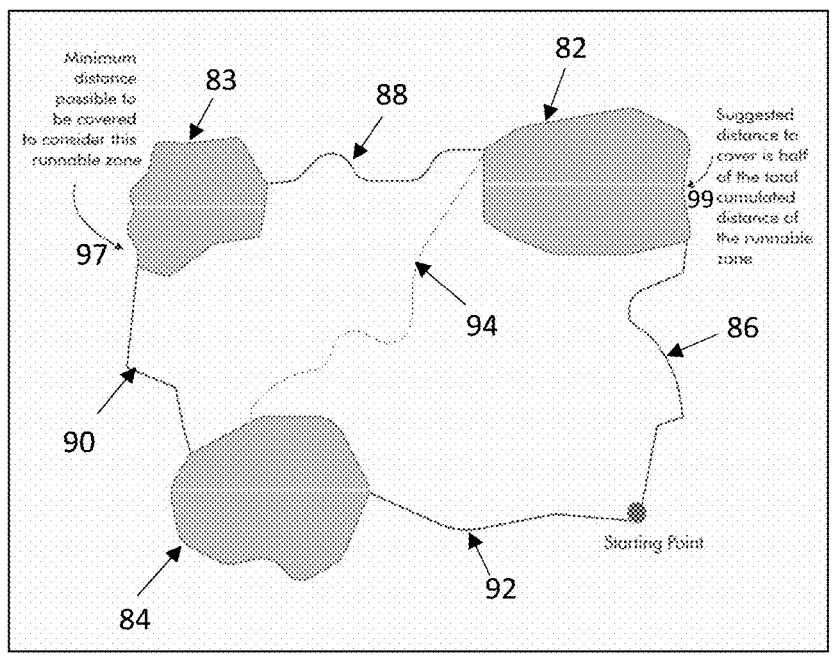
FIG. 13 illustrates a schematic, diagrammatic view of a pedestrian tour.

Referring to the example of FIG. 13, pedestrian tour zones 82-84 are connected to one another by connecting paths 88 and 90. Pedestrian tour zone 82 is connected to the starting point by connecting path 86, while pedestrian tour zone 84 is connected to the starting point by connecting path 92. An alternate connecting path 94 is provided between pedestrian tour zones 82 and 84 to accommodate for a pedestrian tour in which pedestrian tour zone 83 is eliminated. Finally, for each pedestrian tour zone, the initially proposed minimal travel constraint to be spent within the zone—designated as minimum distance in FIG. 13—is shown as a yellow line 97, while the initially proposed suggested travel constraint (e.g., suggested distance) to be spent in the zone is shown as a white line 99.

The described embodiment contemplates that the pedestrian user should be free to deviate from her suggested travel constraint within any given pedestrian tour zone. Provided deviations from the initially planned pedestrian tour are not unreasonably significant, they can be balanced by modifying the suggested travel constraint(s) within one or more of the pedestrian tour zones. Ultimately however, if the user spends too much additional distance or time in one or more pedestrian tour zones, it may become necessary to remove one (or more) of the initially planned pedestrian tour zones from the tour to maintain an initially designated target travel constraint for the pedestrian tour.

By contrast, the embodiment does not contemplate adding a pedestrian tour zone to the tour when the user spends less than the suggested travel constraint(s) in a pedestrian tour zone(s), unless such addition is specifically requested by the user. Rather, as a default approach, surplus travel constraint will be distributed over one or more pedestrian tour zones as such surplus travel constraint becomes available.

The described embodiment thus contemplates adaptation of the pedestrian tour in consequence of the observed behavior of the pedestrian user and deviation(s) from the planned travel constraint(s). In one exemplary adaptation, a suggested travel constraint in a subsequently planned pedestrian tour zone may be decreased or increased. In one instance, the travel constraint is reduced as long as there is enough remaining travel constraint (e.g., distance) budget available to finish the tour properly. When such budget is no longer available, one (or more) initially planned pedestrian tour zones (and their connecting paths) may be eliminated from the tour to re-gain some travel constraint budget.

During a given pedestrian tour, the system of FIG. 1 (including (a) the antenna 17, the communications interface 24 and GPS satellite 30, and/or (b) programmable digital timer 26) can be used to track the user's degree of travel (in terms of, for instance, distance or time) and thereby compute the amount of travel covered or spent by a user. This is noteworthy within the pedestrian tour zones since it is the sort of above-mentioned travel constraint deviations in the pedestrian tour zones that may dictate recalculation of a suggested travel constraint or even necessitate elimination of a pedestrian tour zone from the pedestrian tour.

For each pedestrian tour zone, the system of FIG. 1, (referred to below simply as "System") by way of processor circuit 22, 40 or client computer 42, continuously computes the remaining travel constraint budget available to complete the pedestrian tour. In one example, this budget corresponds to the pedestrian user's target distance minus the distance traveled thus far in executing the pedestrian tour. For each pedestrian tour zone, the System may pre-compute the minimal budget required to complete the tour remainder once the pedestrian leaves that zone. Accordingly, the System can determine a minimal required travel constraint budget, with the minimal required travel constraint budget including travel constraints corresponding with both accumulated minimal travel constraints defined for all the subsequent pedestrian tour zones and the connecting paths. This budget may be further augmented with either the shortest path distance to or time required for reaching the exit of the current pedestrian tour zone.

Pursuant to performing dynamic adaptation, the System may continuously verify whether the remaining time constraint budget for the tour is still higher than that minimal budget required to complete the tour. As long as this is the case, it is enough to adapt one or more suggested time constraints in a subsequent pedestrian tour zone(s). When the time constraint budget is expended, the System, in one example, removes a pedestrian tour zone (and re-distributes the budget that has thus been gained on the subsequent pedestrian tour zone[s]).

The disclosed embodiment contemplates at least two strategies for use in adapting suggested travel constraints: (1) target all remaining pedestrian tour zones in parallel and adapt their respective suggested travel constraints (e.g., adapt each travel constraint against its proportion to the target travel constraint for the pedestrian tour), or (2) adapt the suggested travel constraint of one pedestrian tour zone at a time (i.e., serially) starting with the least interesting pedestrian tour zone.

Figure 14:
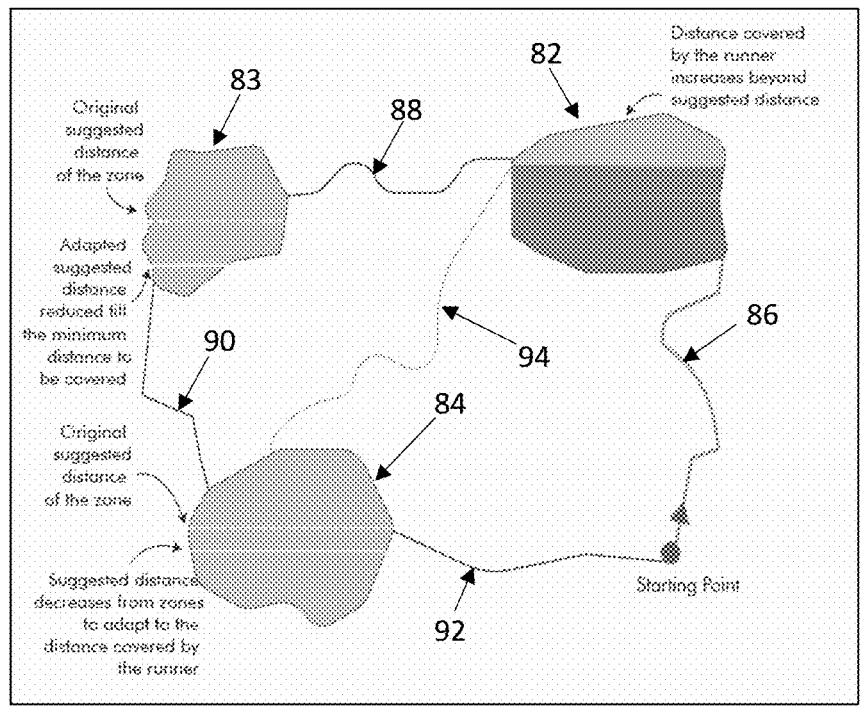
FIG. 14 illustrates a schematic, diagrammatic view of a pedestrian tour.

Referring to FIG. 14, an example of the first strategy is provided. As illustrated in FIG. 14, a pedestrian is currently exploring pedestrian tour zone 82 and the amount of travel (distance, in the example of FIG. 14) already covered in pedestrian tour zone 82, represented by the dark green fill, exceeds the suggested distance initially set for pedestrian tour zone 82. To accommodate for exceeding the suggested distance initially set for pedestrian tour zone 82 (shown as a dashed line), the suggested distance in pedestrian tour zone 83 has been reduced to the same distance as the minimal distance initially set for pedestrian tour zone 83. Also, the suggested distance initially set for pedestrian tour zone 84 (represented by a dashed white line) has been reduced to a distance (represented by a solid white line) just greater than the minimal distance initially set for pedestrian tour zone 84.

In one example of the second strategy, the user can express a specific preference with respect to one or more specific pedestrian tour zones. In turn, during the tour, the actual adapted suggested distances for all pedestrian tour zones in the tour are communicated to the pedestrian so that he can, if necessary, adapt the travel distance/time he spends in any one or more pedestrian tour zones.

Figure 15:
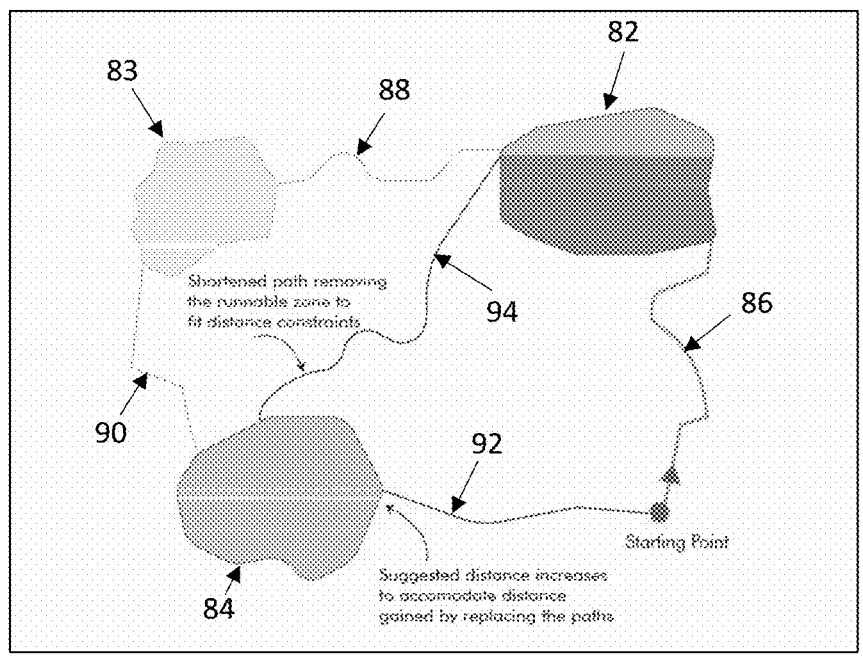
FIG. 15 illustrates a schematic, diagrammatic view of a pedestrian tour in which one pedestrian tour zone has been grayed out.

When the remaining travel constraint budget for a given pedestrian tour becomes insufficient to permit the pedestrian to complete the pedestrian tour in compliance with a preselected target travel constraint, the System removes at least one pedestrian tour zone from the tour. Referring to FIG. 15, an example illustrating the removal of an initially set pedestrian tour zone is provided. As shown in FIG. 15, responsive to revising the tour by eliminating pedestrian tour zone 83, the connecting paths 88 and 90 are faded out, thus directing the pedestrian to use alternate path 94 for the revised tour. As further shown in FIG. 15, the travel constraint gained by removing zone 83 permits redistribution over remaining zone 84 where the suggested time constraint is increased (from a solid white line to a dashed white line).

In the event a user ranks the pedestrian tour zones for a given tour, zone elimination will proceed in accordance with the ranking. Otherwise the System will, at least initially, select the smallest zone that constitutes the least value for exploration and/or that requires the largest detour in terms of additional connecting path distance. In another example, multiple zones could, if necessary, be eliminated from a pedestrian tour. In yet another example, the user can explicitly request to shorten or lengthen the tour, thus prompting the System to alter the zones and connecting paths in real time by either adding/deleting pedestrian tour zones or by adjusting the suggested travel constraint in one of the pedestrian tour zones yet to be visited by the pedestrian user.

As described in further detail below, the pedestrian user may be apprised, during the pedestrian tour, whenever she is coming close to losing a pedestrian tour zone. Accordingly, she can decide to avoid such loss and exit the current zone in which she is touring to directly move to the next pedestrian tour zone. In the event there are no more subsequent pedestrian tour zones in the tour, the user will be warned that she should go home directly and be provided with corresponding turn-by-turn directions.

e. Navigation Support

The disclosed embodiment contemplates two different levels of navigation support for use during the pedestrian tour. Whenever the user is outside a pedestrian tour zone, the above-mentioned turn-by-turn navigation support guides the pedestrian user through a fixed path that takes him to the next pedestrian tour zone or back to the starting point. As soon as the pedestrian user enters a pedestrian tour zone, and as long as the pedestrian user stays within that zone, the above-mentioned flexible navigation support is employed for providing free touring or exploration within the pedestrian tour zone.

Turn-by-turn navigation support, may be provided to a pedestrian through various conventional approaches. As described in further detail below, specific geographic directions may be provided by way of a display on a mobile device. Additionally, specific geographic directions may be provided in form of simple audio or haptic feedback resulting from a head scanning movement. Detailed description regarding a personal navigation device employing haptic feedback is disclosed in Published U.S. Patent Application No. 2016/0216115, the entire disclosure of which is incorporated herein by reference. Detailed description regarding an audio navigational system is disclosed in Published U.S. Patent Application No. 2014/0107916, the entire disclosure of which is incorporated herein by reference. As follows from the description below, turn-by-turn directions are given while the user is on the connecting paths to help him traverse from one pedestrian tour zone to another and, ultimately back to the starting point.

In turn-by-turn navigation mode the System triggers a warning whenever the pedestrian takes a wrong path.

Figure 16:
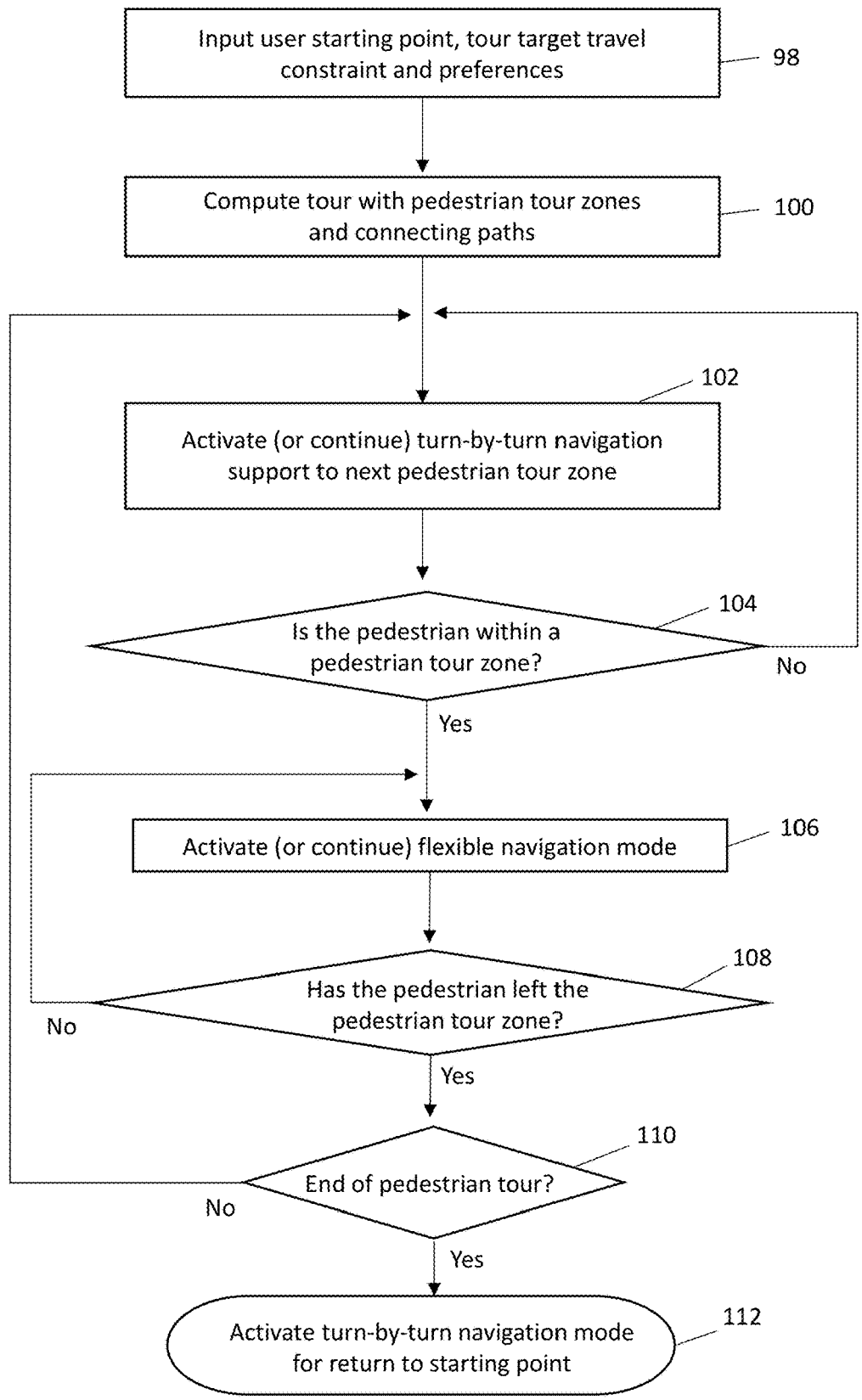
FIG. 16 illustrates a flow chart providing a perspective of turn-by-turn navigation guidance.

Referring now to FIG. 16, a perspective is provided of the turn-by-turn navigation supporting the pedestrian tour (embodied for instance in the navigation module forming part of the local software component 28 [FIG. 1]). To initiate a tour, the pedestrian, at 98, provides the System (via, for instance, input device 14 [FIG. 1]) with tour related information, such as geographic starting point, tour target travel constraint (such as the desired distance or time to be consumed by the entire pedestrian tour) and possible preferences. In one example, the user may request pedestrian tour zones including more greenery and less traffic. Also, the user may express certain preferences relating specifically to runnability or points of interest.

With this inputted information, the System, at 100, generates the pedestrian tour by computing pedestrian tour zones and connecting paths. At 102, turn-by-turn navigation is then activated to provide the pedestrian user with specific geographic directions for accessing the next pedestrian tour or "flexible" zone. As follows from the description below, the geographic directions may, in one example, be provided on the visual display 18 (FIG. 1) in the form of detailed map related directions (including graphic and/or textual directions). As shown at 104, operation includes periodic inquiry to determine if the pedestrian is within a pedestrian tour zone. As long as the pedestrian is outside of a pedestrian tour zone, the process loops back to 102; otherwise, the process proceeds to 106. Additionally, turn-by-turn navigation support is capable of triggering a warning whenever the pedestrian takes a wrong path outside of a pedestrian tour zone.

Referring now to FIG. 16, the flexible navigation mode is activated at 106. That is, when the System detects the pedestrian is within a pedestrian tour zone, turn-by-turn navigation is turned off unless the pedestrian is either approaching a boundary of the pedestrian tour zone or has explicitly requested that turn-by-turn navigation be activated. An inquiry is periodically performed at 108 to determine if the pedestrian user is still within a pedestrian tour zone. To the extent the pedestrian is still in the pedestrian tour zone, the process loops back to 106 for continuing the flexible navigation mode; otherwise, the process proceeds to 110 to determine if another pedestrian tour zone remains for touring. If it is determined, at 110, that another zone is available for touring, then the process loops back to 102 (FIG. 16) to activate turn-by-turn navigation for proceeding to the next flexible (i.e., pedestrian tour zone); otherwise, turn-by-turn navigation is activated at 112 for directing the pedestrian back to the starting point.

In the first or flexible navigation guidance mode, the pedestrian is continuously informed about his progress towards the next upcoming milestone in the current pedestrian tour zone. Also, the pedestrian is notified as soon as he reaches that milestone and about the impact that reaching such milestone will have on the remainder of the tour. Several milestones, including the following, are of particularly noteworthy:

1. Reaching a suggested travel constraint for a current pedestrian tour zone: In one embodiment, the pedestrian is apprised of her progress in reaching the suggested travel constraint and is notified when she reaches the suggested travel constraint.
2. Elimination of a pedestrian tour zone: Upon exceeding the suggested travel constraint, the pedestrian is apprised as to how much further he can continue to tour without causing elimination of a zone and is notified when one or more zones have been eliminated.
3. Risk of exceeding the desired target travel constraint: As described in further detail below, the continually apprises the pedestrian as to when he needs to return to the starting point in order to avoid exceeding the target travel constraint.

Figure 17:
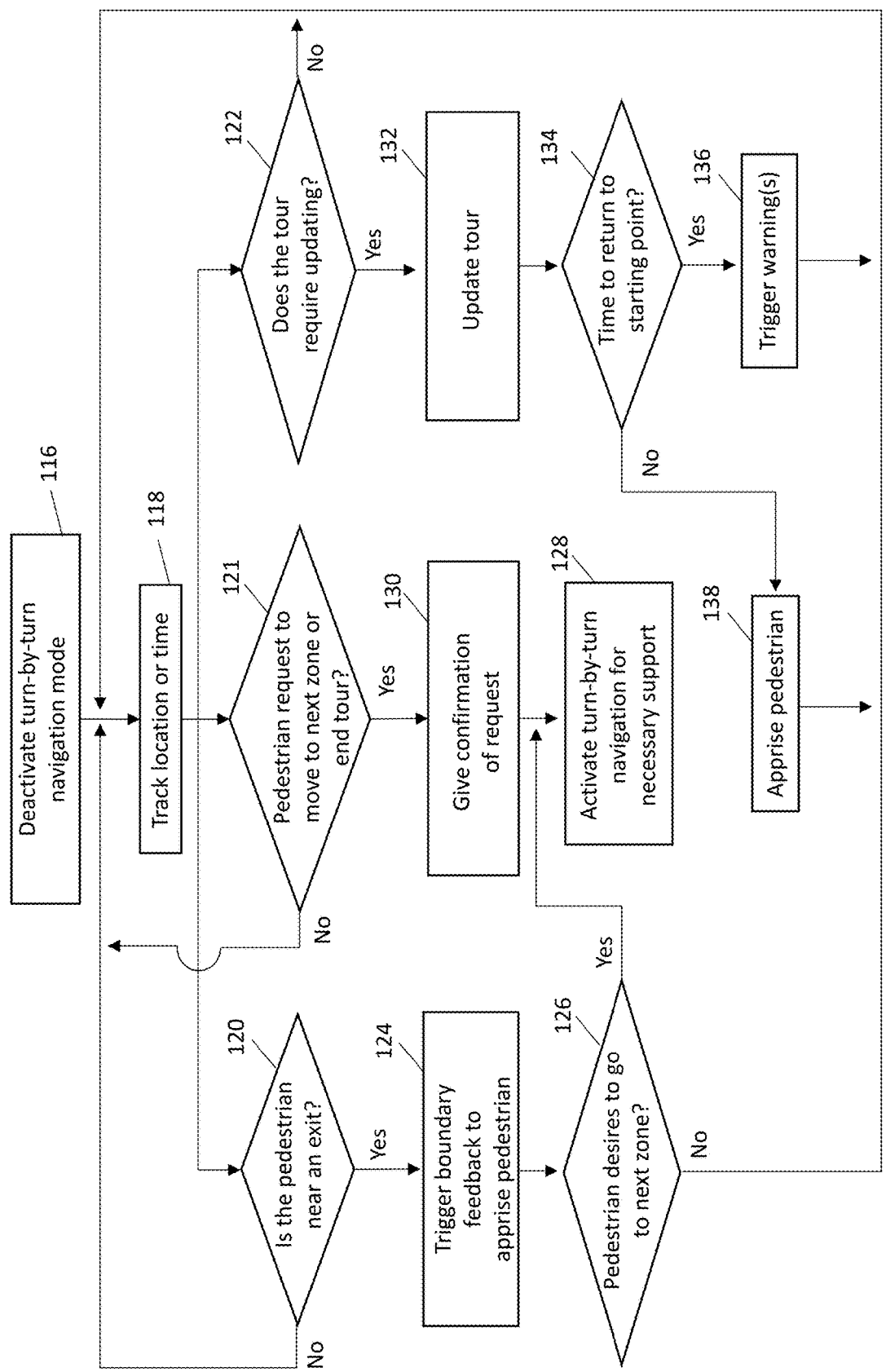
FIG. 17 illustrates a flow chart providing a perspective of flexible navigation guidance.

Referring now to FIG. 17, further perspective is provided regarding operation of flexible navigation (embodied for instance in the navigation module forming part of the local software component 28 [FIG. 1]). Referring specifically to 116 of FIG. 17, the turn-by-turn navigation mode is deactivated as the pedestrian enters a pedestrian tour zone. As the pedestrian tours one of the pedestrian tour zones, the System tracks, per 118, the pedestrian's location or time expended in the zone. As can be appreciated by those skilled in the art, the tracking of location, by use of the above-described GPS system, permits monitoring of distance traveled or time expended by the tour.

In conjunction with tracking location or time, the process of FIG. 17 performs various inquiries by way of 120-122. Referring first to the inquiry of 120 in which the process determines whether the pedestrian is near an exit (i.e., is at an exit edge) of the current zone, feedback (by way of, for instance, the mobile device 11 [FIG. 1]) is provided, per 124, to apprise the pedestrian that she has reached a boundary of the current zone. In turn, the pedestrian may decide, by way of 126, whether to stay in the current zone, in which case the process loops back to 118, or request using the System (e.g., through the mobile device 11 [FIG. 1]) to exit the zone, in which case turn-by-turn navigation is activated, per 128, for providing necessary navigational support, such as directing the pedestrian to the correct exit point of the current pedestrian tour zone and/or directing the pedestrian to the next pedestrian tour zone/starting point.

Referring to 121 of FIG. 17, the pedestrian may, at any time during the tour, request using the System (e.g., through the mobile device 11 [FIG. 1]) to move to the next pedestrian tour zone or end the pedestrian tour. In the event the System receives an input indicating such request, the request is confirmed at 130 and necessary navigational support for continuing to the next zone or starting point is provided at 128.

Referring to 122 of FIG. 17, the process determines whether updating of the tour is required. As follows from the description above and below, several events can arise during the tour necessitating some degree of update. For instance, dynamic adaptation with respect to one or more pedestrian tour zones, including elimination of at least one zone, may necessitate the generation of a tour update. After updating the tour at 132, the process determines, at 134, whether the target travel constraint dictates that the pedestrian should return to the starting point. If returning to the starting point is required in order to avoid exceeding the target travel constraint, then the pedestrian is warned, via 136, that such return is required; otherwise, the process, at 138, apprises the pedestrian of the update and loops back to 118 for further location or time tracking.

f. Example of a Tour

With reference to FIGS. 18-34 below, a description illustrating an exemplary tour ("tour example") along with an interface conveying necessary information about a pedestrian user's progress relative to the tour is provided. As follows, the interface permits, among things, a pedestrian to adapt walking/running behavior based on continuously provided information about the tour, and to request, at any time, changes in the tour. In FIGS. 18-34, user interface elements (e.g., images) representative of an interface are projected onto a display or screen 18 using a processor (shown in FIG. 1 as processor circuit 22) and a memory (shown in FIG. 1 as memory 13), which interface may include a selected geographical zone and which memory may store a preset target distance for a pedestrian tour.

In one embodiment, the interface of mobile device 11 can be used to convey runnability metrics, such as the mean runnability score and degree of flexibility (i.e., the availability of alternative path options in each pedestrian tour zone) to the pedestrian user through different colors and textures. In one example, referring to FIG. 18, the runnable zone at 202 (light green) corresponds to a lower mean runnability score (and lower path options) while the runnable zone at 204 (darker green) corresponds to a higher mean runnability score (and greater path options). In another example, the degree of flexibility can be represented through texture density: the higher the degree of flexibility the higher the density.

Figure 18:
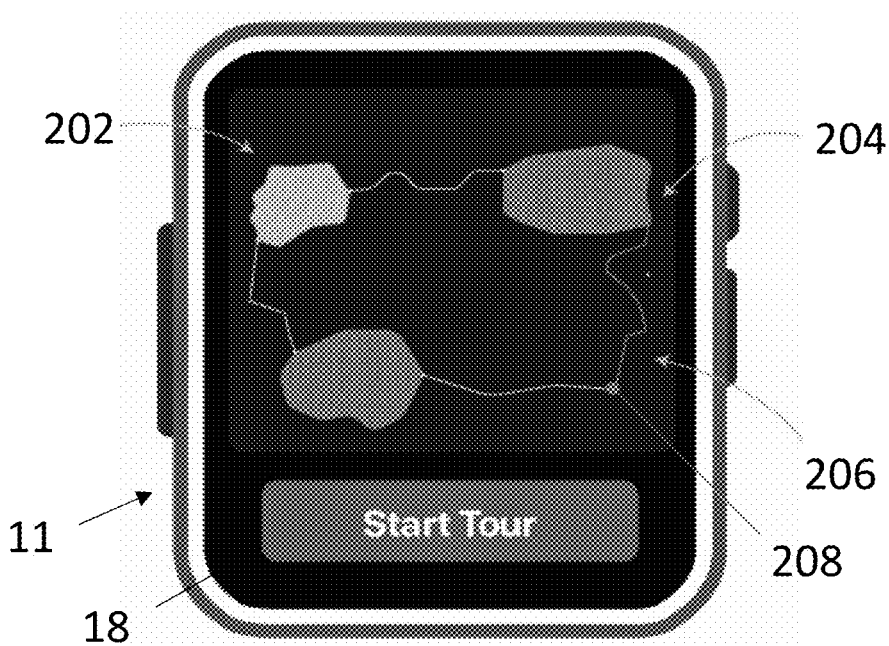
FIG. 18 illustrates a planar view of a mobile device displaying a visual representation of a pedestrian tour.
Figure 19:
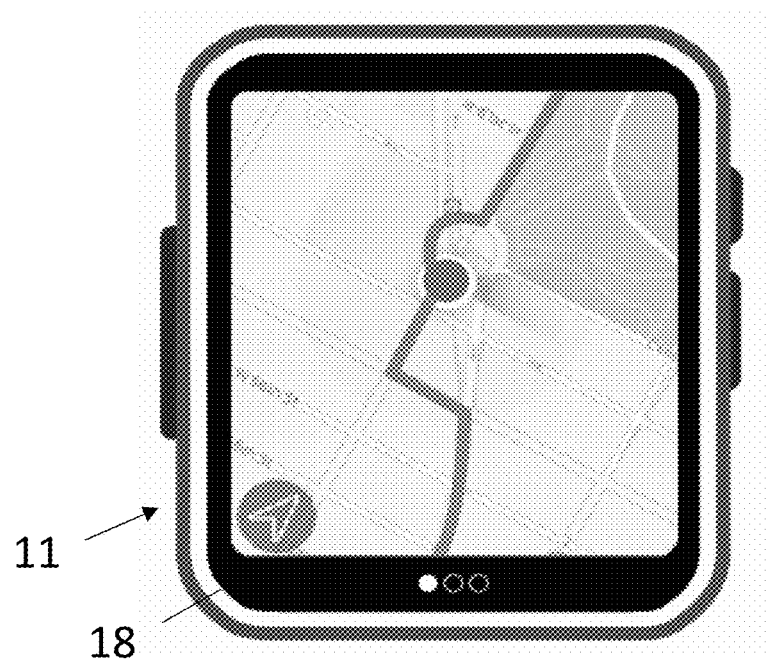
FIG. 19 illustrates a planar view of the mobile device displaying turn-by-turn directions.

With continued reference to the interface of FIG. 18, the overall tour is initially shown and a suggested direction for the overall tour is highlighted at 206 (for instance, in the color pink) from starting point 208. While the pedestrian user has the option to start the tour in a direction opposite to that suggested by the interface, the example of FIG. 18 favors reaching the larger or preferred pedestrian tour zones first so the pedestrian user can explore those zones as much as desired.

Figure 20:
FIG. 20 illustrates a planar view of the mobile device with a display showing tour progress metrics, such as overall pedestrian tour progress.
Figure 21:
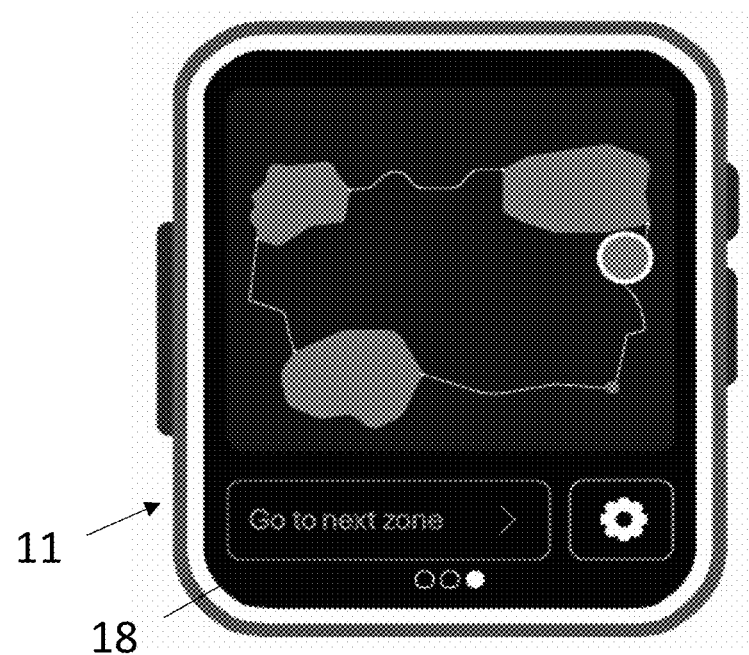
FIG. 21 illustrates a planar view of the mobile device with a display showing a visual representation of a pedestrian tour and the current location of a pedestrian user relative to the pedestrian tour.

As the pedestrian user begins the tour, turn by turn directions (FIG. 19) are provided by way of a display showing both the path to take/taken (highlighted in blue on the map) and current location (blue dot). Supplementary audio or haptic feedback may also be provided by way of a suitable subsystem operatively associated with the mobile device 11. The pedestrian user can also access secondary information screens showing tour progress (FIG. 20) and current location with respect to the overall tour (FIG. 21). For the screen of FIG. 20, a top bar 140 is employed to indicate progress of the pedestrian user with respect to the target travel constraint. The bar 140 further differentiates the pedestrian tour zones (dark green) from the connecting paths (light green), while a bottom bar 142 indicates the progress on the current connecting path towards the next pedestrian tour zone. In the example of FIG. 20, the pedestrian user has nearly reached the first pedestrian tour zone (with only 100 more meters to cover before entering it).

Figure 22:
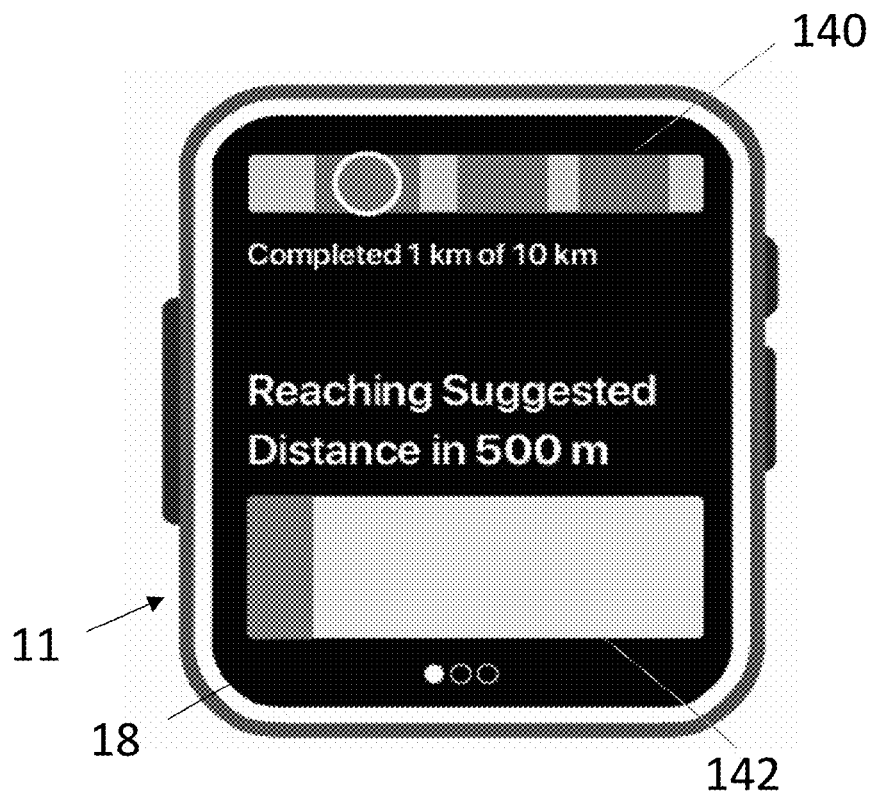
FIG. 22 illustrates a planar view of the mobile device with a display showing tour progress metrics and indicating that flexible navigation has been activated.

Referring to FIG. 22, when entering a pedestrian tour zone, the flexible navigation mode is activated. The top bar 140 communicates the overall progress on the tour and the suggested travel constraint (shown as distance) for each pedestrian tour zone through a dark green color (similar, in concept, to the top bar 140 of FIG. 20). The bottom bar 142 conveys information indicating the distance remaining for the pedestrian user to reach the next milestone. These milestones include, among other things, reaching the suggested distance within a pedestrian tour zone and losing a pedestrian tour zone (when a corresponding maximal excess distance limit [described in further detail below] is reached).

Figure 23:
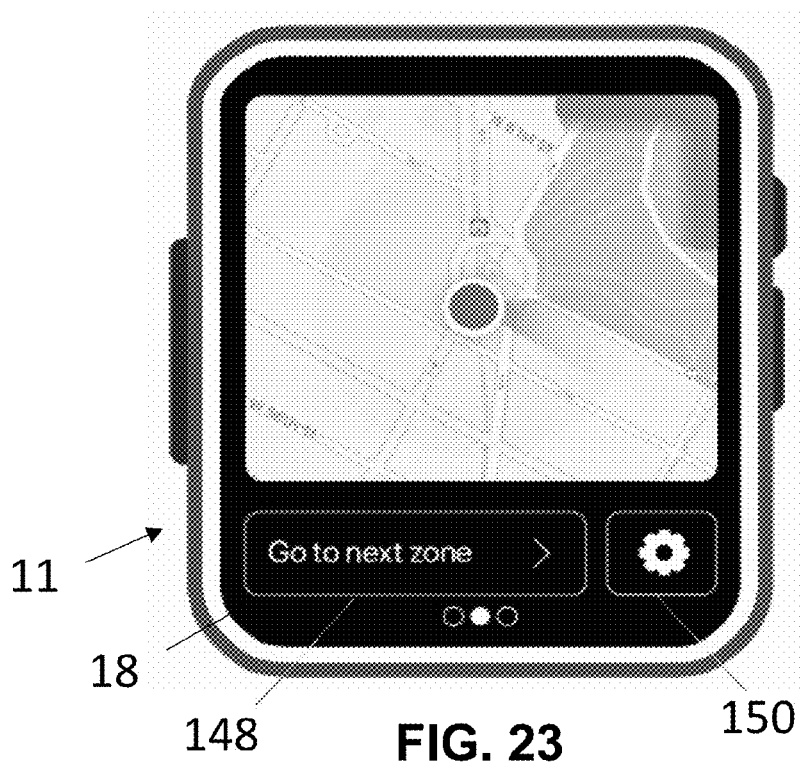
FIG. 23 illustrates a planar view of the mobile device in which turn-by-turn guidance has been activated to indicate the position of a correct exit.
Figure 24:
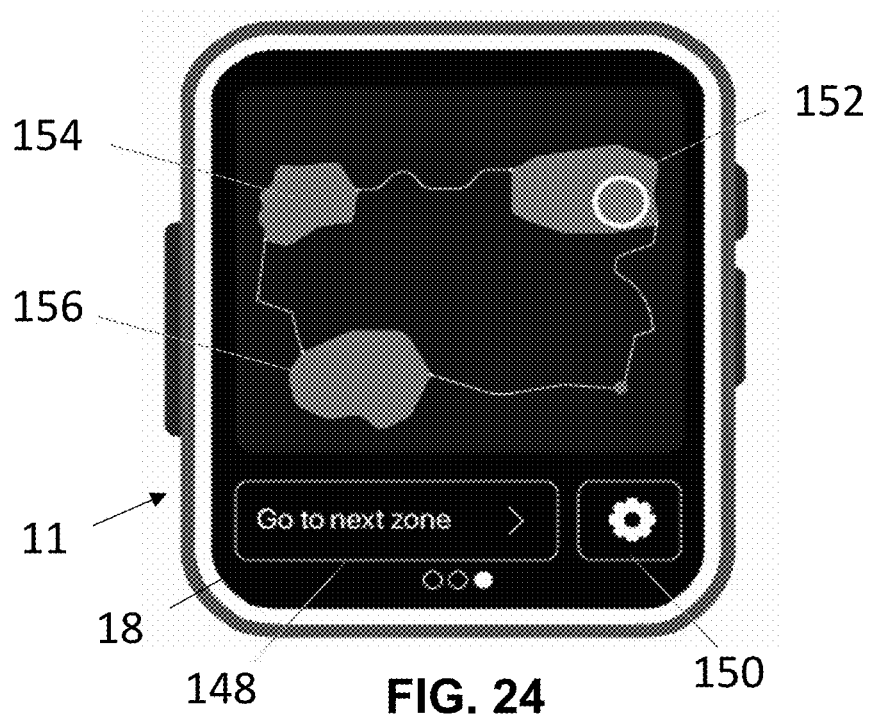
FIG. 24 illustrates a planar view of the mobile device with the display showing both a visual representation of the pedestrian tour and a current position of a pedestrian user.

Referring to FIG. 23, the pedestrian user has access to other visualizations, such as an intermediate view of the pedestrian tour zone in which the pedestrian user is currently walking or running. In one embodiment, the screen of FIG. 23 can be swiped to obtain the screen of FIG. 24 in which the pedestrian user's progress with respect to the overall tour can be viewed. Referring again to FIG. 23, the intermediate view of the current pedestrian tour zone provides detailed map-based information including both the current position of the pedestrian user and directions to the correct exit of the zone. Each of the screens of FIG. 23 and FIG. 24 include "go to the next zone" and settings buttons, respectively designated by the numerals 148 and 150. The corresponding settings feature permits the pedestrian user to modify the tour dynamically, such as obtaining guidance for returning to the starting position directly or augmenting the current target distance for permitting the pedestrian user to continue exploring the current pedestrian tour zone without losing a subsequent zone.

Figure 25:
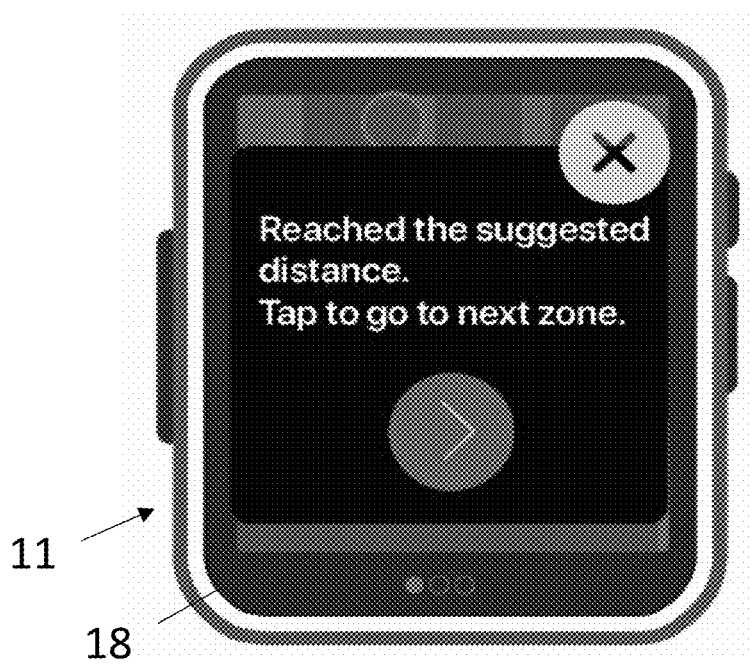
FIG. 25 illustrates a planar view of the mobile device with a display indicating that the pedestrian user has reached the suggested travel constraint.

Referring to FIG. 25, if the pedestrian user reaches the suggested travel constraint of a pedestrian tour zone, the pedestrian user is notified that he has reached this travel constraint, such as the suggested distance or the suggested time. Responsive to the notification, the pedestrian can, for instance, either request to be guided to the next pedestrian tour zone or ignore the notification and continue walking or running within the current pedestrian tour zone.

Figure 26:
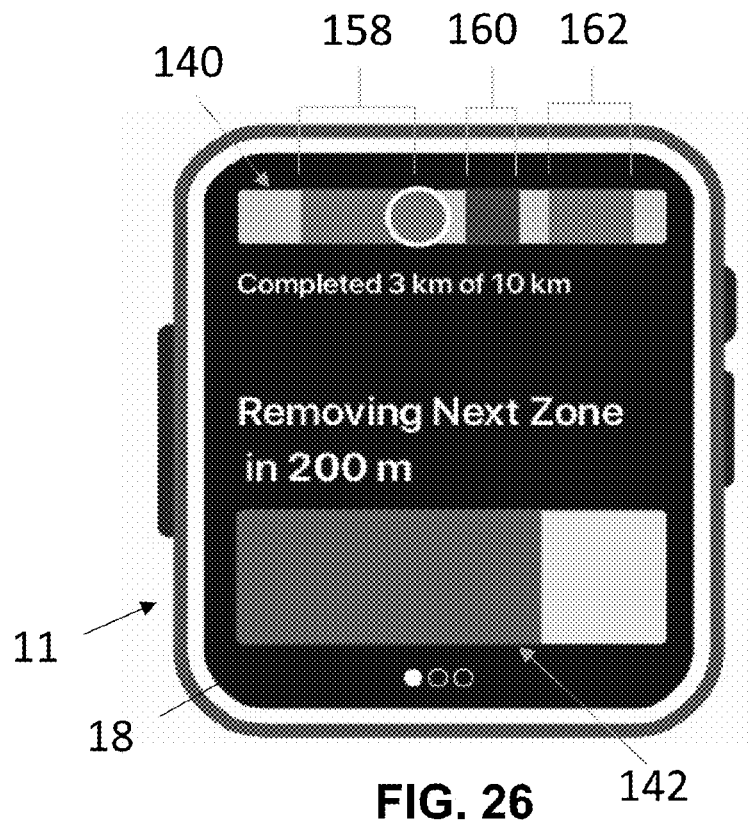
FIG. 26 illustrates a planar view of the mobile device with a display apprising the pedestrian user of a possible pedestrian tour zone removal.

During one embodiment of the tour, if a pedestrian user exceeds the suggested distance in one zone, the suggested distance in another pedestrian tour zone may be reduced to avoid exceeding the target travel constraint originally set by the pedestrian user. To understand how such reduction works, reference is made to the zones 152, 154 and 156 (FIG. 24) with the travel constraints of zones 152, 154 and 156 respectively corresponding with bar segments 158, 160 and 162 (FIG. 26) in top or indicator bar 140. For the mobile device 11 of FIG. 26, as the pedestrian user exceeds the suggested travel constraint, a gradual decrease in suggested travel constraint begins in pedestrian tour zone 154 (FIG. 24), the pedestrian tour zone rated as the least preferred by the pedestrian user. Accordingly, pedestrian tour zone 154 will be the first zone removed, if necessary. The segment 160 of FIG. 26 is highlighted in red to indicate that a reduction of suggested travel constraint is occurring.

In the tour example, the reduction of the suggested travel constraint (e.g., distance) in zone 154 continues until the minimal distance for pedestrian tour zone 154 is reached. Responsive to reaching the minimal travel constraint in pedestrian tour zone 154, reduction of the suggested travel constraint for pedestrian tour zone 156 is commenced. As further illustrated in FIG. 26, the bottom bar 142 continuously apprises the pedestrian user as to when the next pedestrian tour zone will be removed from the tour if the pedestrian user continues to exceed the suggested travel constraint of the current pedestrian tour zone in which the pedestrian user is touring.

In an alternative tour example, dynamic adaption is performed in parallel as opposed to serially (as described for the tour example directly above). That is, pursuant to parallel management, the suggested travel constraint for each of two or more pedestrian tour zones (other than the one in which the pedestrian user is currently touring) would be reduced simultaneously.

Figure 27:
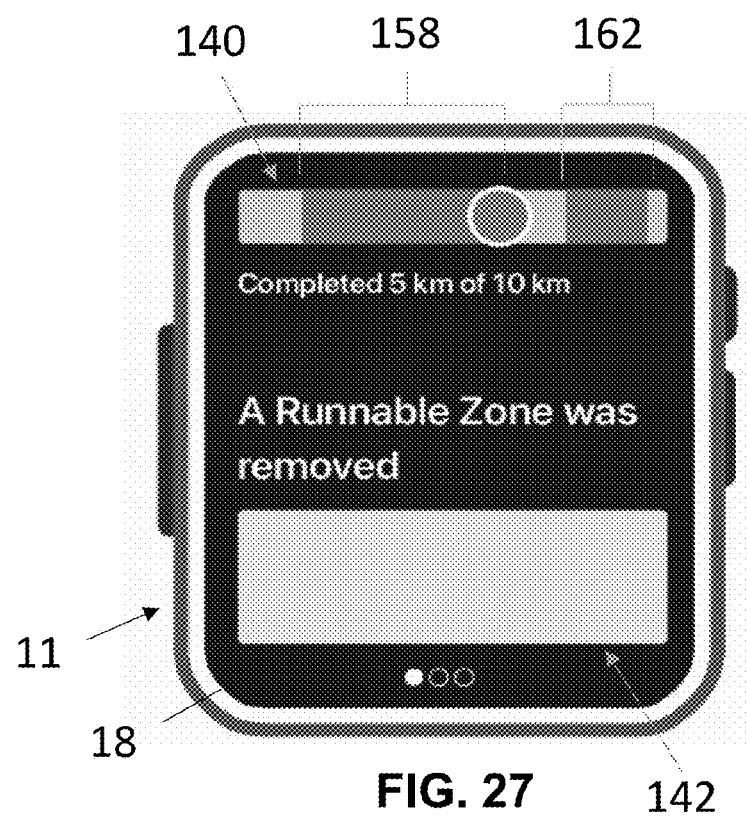
FIG. 27 illustrates a planar view of the mobile device with the display showing tour progress and apprising the pedestrian user that a pedestrian tour zone has been removed.
Figure 28:
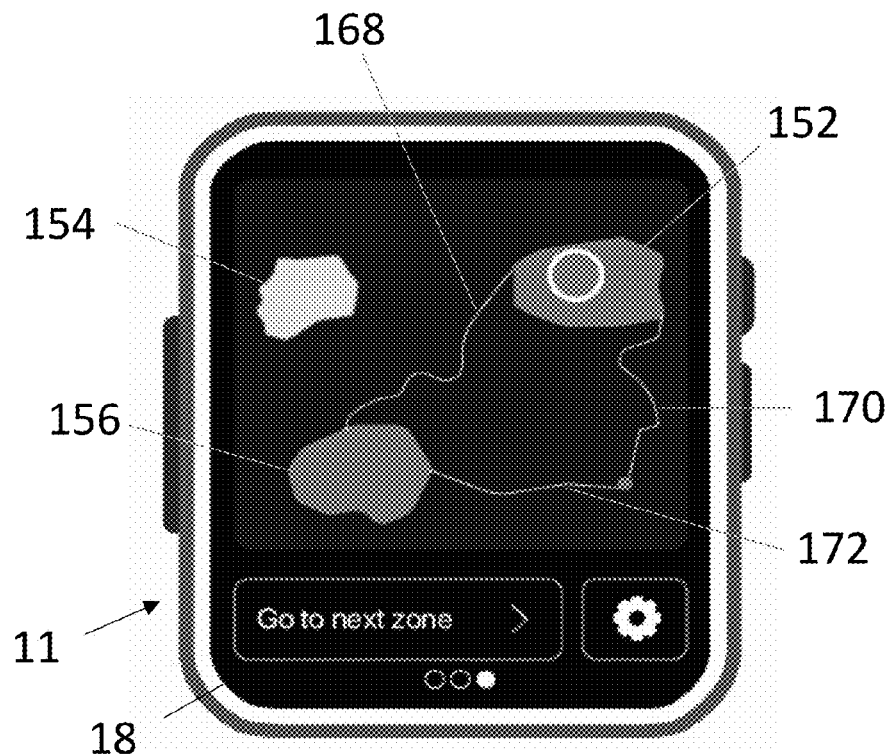
FIG. 28 illustrates a planar view of the mobile device with a display showing both a reconfigured pedestrian tour and the current location of the pedestrian user.
Figure 29:
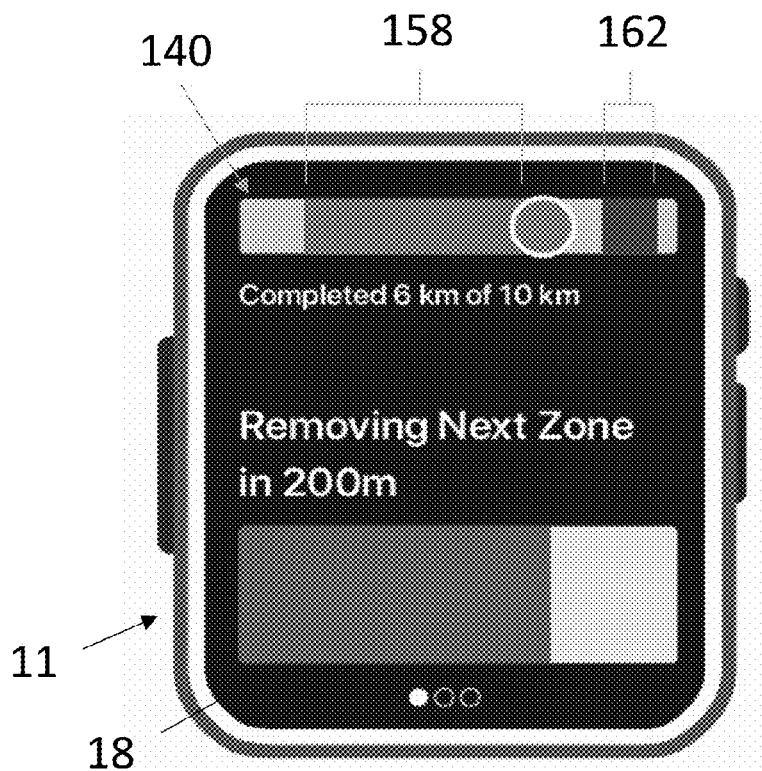
FIG. 29 illustrates a planar view of the mobile device with the display showing tour progress and warning the pedestrian user that a pedestrian tour zone is about to be removed.

Continuing with the description of the tour example and referring to FIG. 27 and FIG. 28, further exploration of pedestrian tour zone 152 by the pedestrian user results in the elimination of the pedestrian tour zone 154 when the minimal travel constraint for each one of pedestrian tour zone 154 and 156 has been reached. As illustrated in FIG. 27, the pedestrian user is apprised when the pedestrian tour zone 154 has been eliminated and the representative segment corresponding with pedestrian tour zone 154, namely representative segment 160 (FIG. 26), is no longer displayed in the indicator bar 140 (FIG. 27). It will be appreciated that if the pedestrian user fails to express a preference of pedestrian tour zones for use in possible elimination, then the System might, in an alternative tour example, eliminate pedestrian tour zone 156 instead of pedestrian tour zone 154. This could occur during parallel adaptation where eliminating pedestrian tour zone 156, instead of pedestrian tour zone 154, would facilitate compliance with an originally selected target time constraint.

Referring to FIG. 28, responsive to eliminating pedestrian tour zone 154 from the tour, pedestrian tour zone 154 is grayed out (indicating that it is no longer part of the tour) and any connecting paths between pedestrian tour zone 154 and pedestrian tour zones 152, 156 are no longer displayed. In turn, an alternative connecting path 168 is shown, along with connecting paths 170 and 172, as the currently recommended connecting paths for the tour. As illustrated by the indicator bar 140 of FIG. 27, the travel constraint (e.g., distance) gained by both removing pedestrian tour zone 154 and replacing the connecting paths between pedestrian tour zone 154 and pedestrian tour zones 152, 156 with the connecting path 168 is distributed over a reconfigured tour.

Continuing with the tour example, if the pedestrian user continues to explore pedestrian tour zone 152 even after pedestrian tour zone 154 has been eliminated, then the process of dynamic adaptation resumes for pedestrian tour zone 156. That is, continued exploration will, as illustrated by the highlighted bar segment 162 of FIG. 29, result in decrease of the suggested travel constraint for pedestrian tour zone 156. Assuming the pedestrian user continues to explore pedestrian tour zone 152 and the minimal travel constraint of pedestrian tour zone 156 is reached, then pedestrian tour zone 156 will be eliminated from the tour.

Figure 30:
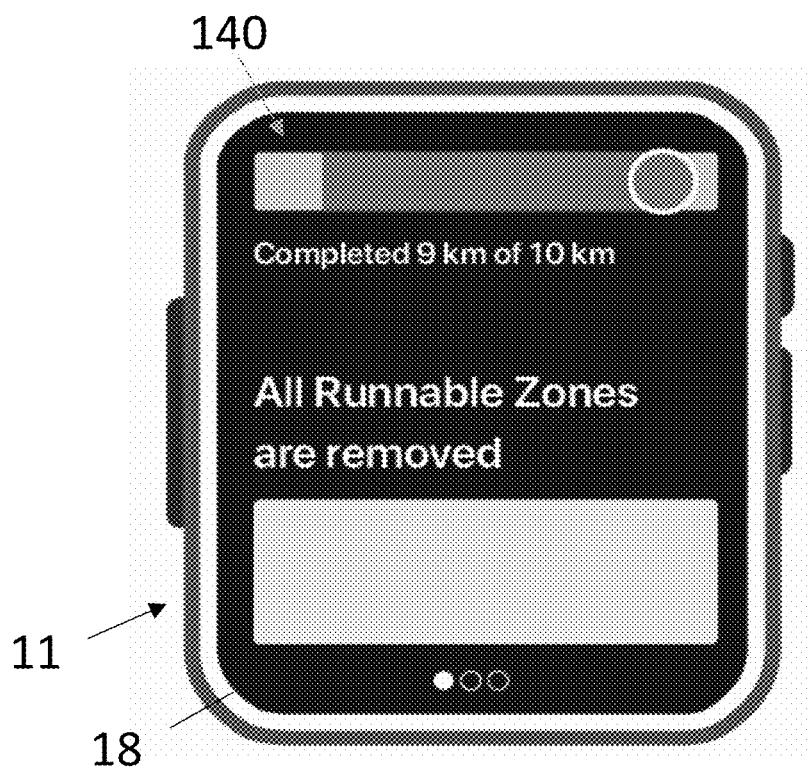
FIG. 30 illustrates a planar view of the mobile device with the display showing tour progress and indicating that all runnable or pedestrian tour zones have been removed.
Figure 31:
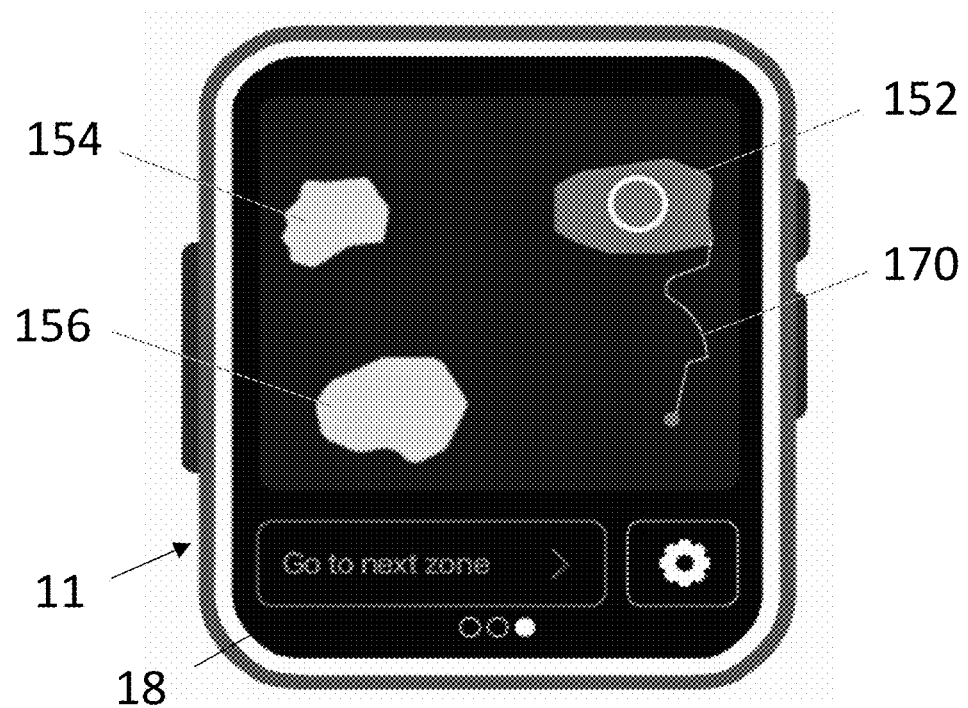
FIG. 31 illustrates a planar view of the mobile device with a display showing both a reconfigured pedestrian tour and the current location of the pedestrian user.
Figure 32:
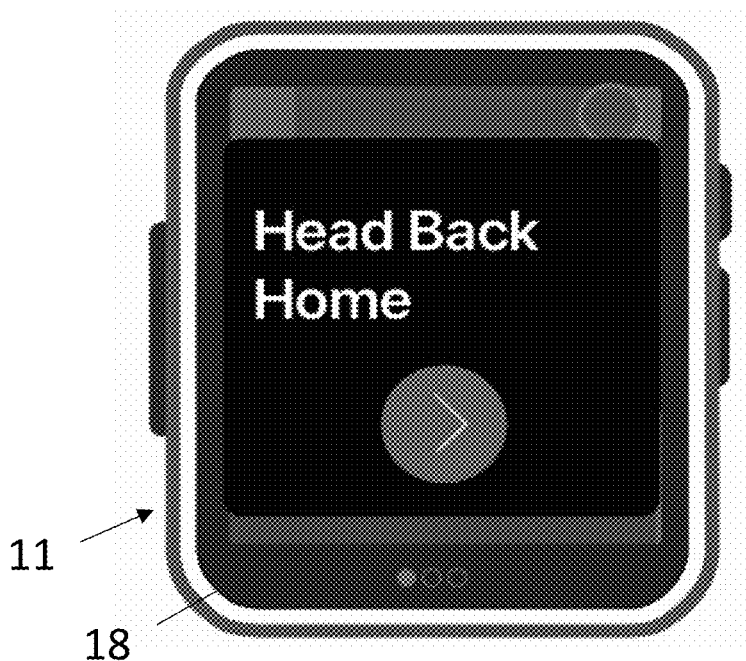
FIG. 32 illustrates a planar view of the mobile device with a display indicating that the pedestrian user should return home (i.e., to the starting point)
Figure 33:
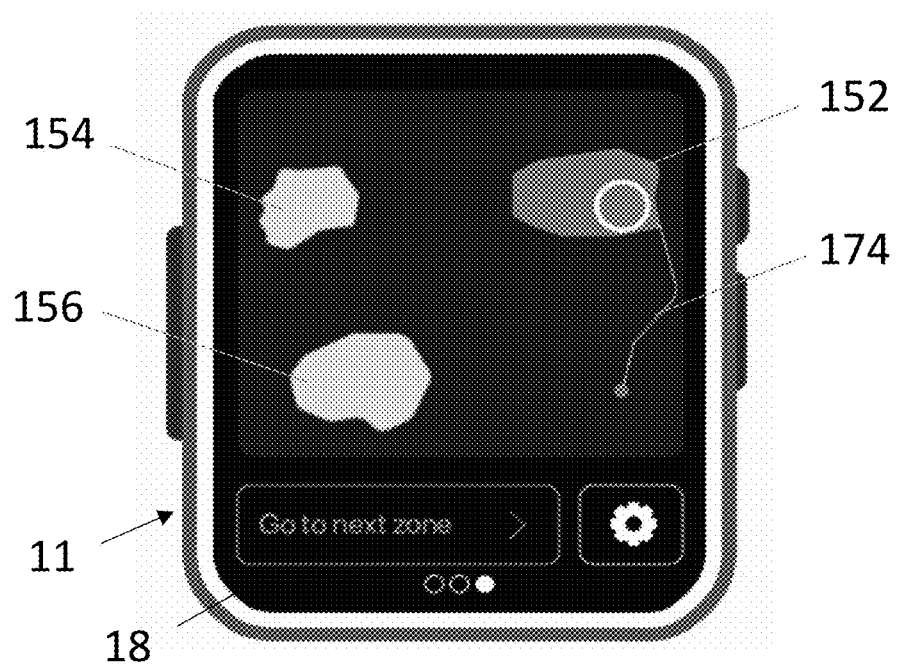
FIG. 33 illustrates a planar view of the mobile device with a display showing both the reconfigured pedestrian tour of FIG. 31 and the shortest path home from the current pedestrian tour zone.

Referring to FIG. 30 and FIG. 31, when all pedestrian tour zones other than the pedestrian tour zone currently being explored have been eliminated (and, consequently, grayed out), the System considers the minimum budget (in terms of, for instance distance or time remaining for the tour) for returning to the starting point. Accordingly, the pedestrian user is permitted to complete the tour in compliance with the remaining budget. When the pedestrian user reaches the minimum budget to get back home, the System provides a warning (FIG. 32) and switches the interface from flexible navigation to turn-by-turn navigation (of the type shown in, for instance, FIG. 23). For the tour example in which pedestrian tour zones 154 and 156 are eliminated, FIG. 33 shows the shortest path home from the pedestrian tour zone 152 (namely return path 174) the pedestrian user is currently exploring.

Figure 34:
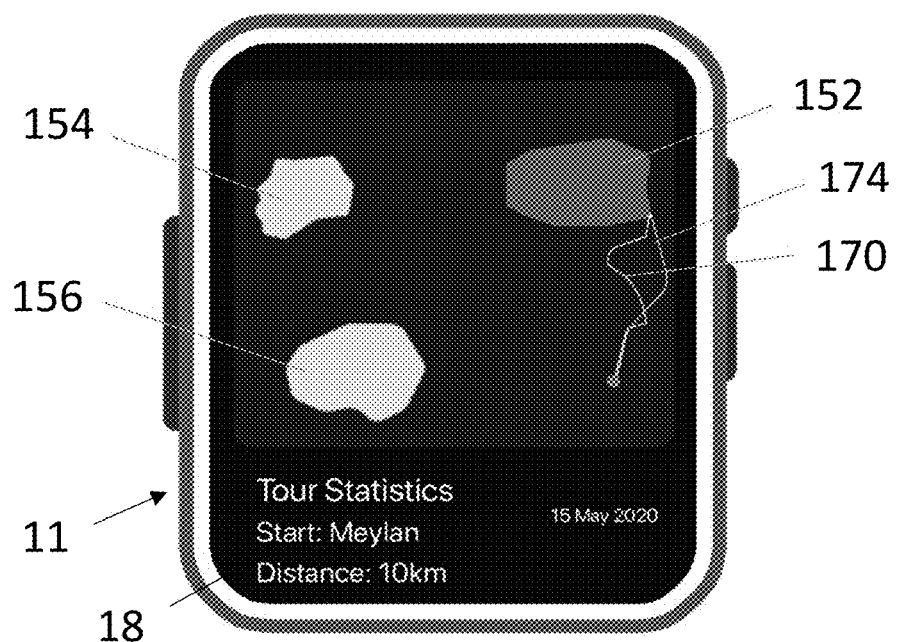
FIG. 34 illustrates a planar view of the mobile device with a display showing both the reconfigured pedestrian tour of FIG. 33 and the tour actually performed by the pedestrian user.

Referring to FIG. 34, at the end of the tour, the tour actually performed by the pedestrian user is shown in comparison with the tour originally proposed. In particular, each pedestrian tour pedestrian tour zone(s) actually toured by the pedestrian is shown in a darker color while each pedestrian tour pedestrian tour zone(s) not reached by the pedestrian user is grayed out. Also, selected tour statistics are displayed.

Several advantageous features of the above-described embodiments will be appreciated by those skilled in the art:
  (i) First, a pedestrian tour, including pedestrian tour zones and connecting paths, is optimally generated to accommodate for a pedestrian user's walking/running requirements as well as perceived or actual preferences/priorities of the pedestrian user. The pedestrian tour zones are generated by analyzing map data including information about walkable/runnable edges existing within a geographic zone selected by the pedestrian user. Moreover, the best connecting paths for accessing those generated pedestrian tour zones are identified.
  (ii) Second, the pedestrian user is provided with one of several approaches for facilitating execution of a pedestrian tour. More particularly, information useful in performing the pedestrian tour may be provided via an interface including a large range of metrics. These metrics may include both progress made through the tour by the pedestrian user as well as the current status of the pedestrian tour (including current pedestrian tour configuration). The interface, which may be visually, audially or haptically based, can be used to apprise the pedestrian user of dynamic adaptation of the pedestrian tour that is occurring or is going to occur. Moreover, reconfiguration of the pedestrian tour, as a result of such dynamic adaptation, can be readily conveyed to the pedestrian user.

(iii) Third, when using a display to facilitate the pedestrian tour, various color based visualizations may be advantageously employed. In one example, the extent to which a pedestrian user has traveled through a given pedestrian tour zone can be illustrated by a change in color of a representation of the given pedestrian tour zone. In another example, the color of the representation of the given pedestrian tour zone can be changed when that given pedestrian tour zone has been eliminated from the pedestrian tour.

(iv) Fourth, the disclosed embodiments set forth a pedestrian tour generation approach that is highly flexible and customizable. As the pedestrian user varies the extent of his or her travel through the pedestrian tour, dynamic adaptation and/or reconfiguration can be performed with respect to one or more aspects of the pedestrian tour. In one example, as the pedestrian user exceeds a suggested travel constraint (e.g., suggested distance or time) in one pedestrian tour zone, a suggested travel constraint in another pedestrian tour zone can be decreased. In another example, when a pedestrian zone is eliminated from the pedestrian tour, any surplus travel constraint remaining as a result of such elimination can be redistributed across one or more remaining pedestrian tour zones and connecting paths can be remapped, if necessary. Moreover, a pedestrian tour can be reconfigured in response to a request from the pedestrian user.

(v) Fifth, the disclosed embodiments describe a hybrid navigation approach that serves the dual purpose of (1) directing the pedestrian user to each pedestrian tour zone in a sufficiently detailed manner and (2) permitting the pedestrian to use each pedestrian tour zone in a flexible way, promoting, among other things, enjoyable exploration. (1) is achieved by providing the pedestrian user with detailed geographic map directions when the pedestrian is walking or running outside of a pedestrian tour zone and (2) is achieved by providing the pedestrian user with minimal navigational information while touring any one of the pedestrian tour zones.

(vi) Finally, the hybrid navigation greatly facilitates execution of the pedestrian tour. In one advantageous example of operation, the navigation approach providing detailed geographic map directions is deactivated whenever the pedestrian user is approaching a pedestrian tour zone and is activated as the pedestrian user is leaving a pedestrian tour zone. As disclosed, each pedestrian tour zone includes a bounding path with walkable/runnable edges serving as entrances to or exits from the pedestrian tour zone. For instance, the pedestrian user can, while touring any one of pedestrian tour zones, seek detailed geographic map directions to the currently nearest exit walkable/runnable edge.

g. Additional Example—Identifying Pedestrian Tour Zones in a Neighborhood

The following description is directed toward an example method to identify pedestrian tour zones in a graph representing a neighborhood. The graph is constructed from map data; the nodes represent the intersections and the edges path linking the intersections. Furthermore, the geometry of the map data is extracted (i.e., the position of each node and the angles between the edges leaving it which will allows ordering of the edges leaving a node accordingly, e.g., in clock-wise fashion). The method starts from a scored graph, where all edges have an assigned runnability score indicating their (average) quality for running. In a first processing step, the method uses thresholding and pre-processing to identify candidate pedestrian tour zones. In a second processing step, the method rejects insignificant, inhomogeneous and in-sufficiently flexible candidate pedestrian tour zones and thus keeps only the best pedestrian tour zones to integrate into running tours.

g.1: Processing Step 1: Identifying Candidate Pedestrian Tour Zones Using Thresholding and Pre-Processing:

Thresholding is used to distinguish three types of edges in the graph: (i) desirable edges (i.e., edges that have a score above a desired threshold runnability value S1); (ii) unacceptable edges (i.e., edges not well suited for running that have a score below an unacceptable threshold runnability value S2, with S2<S1); (iii) acceptable edges (i.e., edges that have a score between S1 and S2). Next, all connected subgraphs SG1 composed only of desirable edges are identified. Next, for each subgraph SG1 the largest inner tour it contains is identified as explained further below in section g.3. If none exists, the subgraph is ignored, meaning that there is no candidate pedestrian tour zone to consider for this subgraph; if an inner tour is found, the subgraph is reduced to the edges contained within the boundary of this inner tour (i.e., removing all edges that leave this inner tour towards the outside). Each graph and the geographic area delimited by such a largest inner tour is then considered in the subsequent steps as a candidate pedestrian tour zone. This step produces thus a preliminary list of candidate pedestrian tour zones.

Each candidate pedestrian tour zone identified in the previous step may still include unacceptable edges. To exclude such unacceptable edges, each zone is thus processed and adjusted until no unacceptable edge remains within it: (i) first all unacceptable edges and corresponding connected subgraphs SG2 within the candidate pedestrian tour zone are identified; (ii) if no such subgraph SG2 exists, the current candidate pedestrian tour zone is kept as it is for consideration in the post-processing step; (iii) if such unacceptable subgraphs exist, the candidate pedestrian tour zone is reduced as follows, until no such subgraph remains in the candidate pedestrian tour zone: (a) the smallest tour around a subgraph SG2 touching the border of the current candidate pedestrian tour zone and using paths belonging to subgraph SG1 is identified and the subgraph contained in that smallest tour is removed from the current candidate pedestrian tour zone thus reducing the candidate pedestrian tour zone and the corresponding subgraph SG1 accordingly; (b) the largest inner tour of the now reduced candidate pedestrian tour zone is identified; if none exists, the process stops here and the candidate pedestrian tour zone is eliminated.

A post-processing step can analyze the largest inner tour of the resulting pedestrian tour zone, and more precisely the cases where otherwise disconnected sub-graphs are connected through single nodes. The subgraphs can then be cut at these nodes and treated as independent pedestrian tour zones.

g.2: Processing Step 2: Rejecting Insignificant, Inhomogeneous and In-Sufficiently Flexible Candidate Pedestrian Tour Zones:

Rejecting insignificant candidate pedestrian tour zones (i.e., zones that are not worthwhile exploring because they do not cover a significant cumulated distance or geographic area and/or have an insufficient density) is based on: (i) distance: the sum of the distance of all edges contained in each candidate pedestrian tour zone, Dist, is computed and all candidate pedestrian tour zones with Dist below a minimum threshold distance DistMin being rejected; (ii) geographic area: the surface of each candidate pedestrian tour zone (i.e., of the area contained within its largest inner tour) A, is computed and all candidate pedestrian tour zones with a surface below a minimum threshold surface $A_{Min}$ are rejected; and (iii) density: the density of each candidate pedestrian tour zone, Dens=Dist/A, is computed and all candidate pedestrian tour zones with a density is below $Dens_{Min}$ are rejected.

Rejecting inhomogeneous candidate pedestrian tour zones (i.e., zones containing too many edges or, more precisely, too much distance with a runnability score below the initially desired runnability score S1): a threshold value $S_{Min}$, between S1 and S2 is fixed. The average runnability score, $S_{avg}$ of each pedestrian tour zone is computed from all edges($e_i$) it includes (1/Dist*Σ score_$e_i$*dist_$e_i$) and all candidate pedestrian tour zones with an average score below the threshold $S_{Min}$ are rejected.

Rejecting in-sufficiently flexible candidate pedestrian tour zones (i.e., zones that do not enable a significant variety of alternative runnable tours): (i) for all nodes within the candidate pedestrian tour zone the number of edges entering/leaving them that do not belong to dead ends is counted; the number of alternatives Alt is computed by subtracting 2 from this number. Indeed, for each node, Alt represents the number of alternative edges that allow one to go beyond simply crossing the node by entering and leaving it. All candidate pedestrian tour zones with a number of alternatives below a fixed minimum number of alternatives $Alt_{Min}$ are rejected.

The threshold runnability values used in the first step can be adjusted to increase/decrease the number of candidate pedestrian tour zones to consider in a neighborhood.

Figure 35:
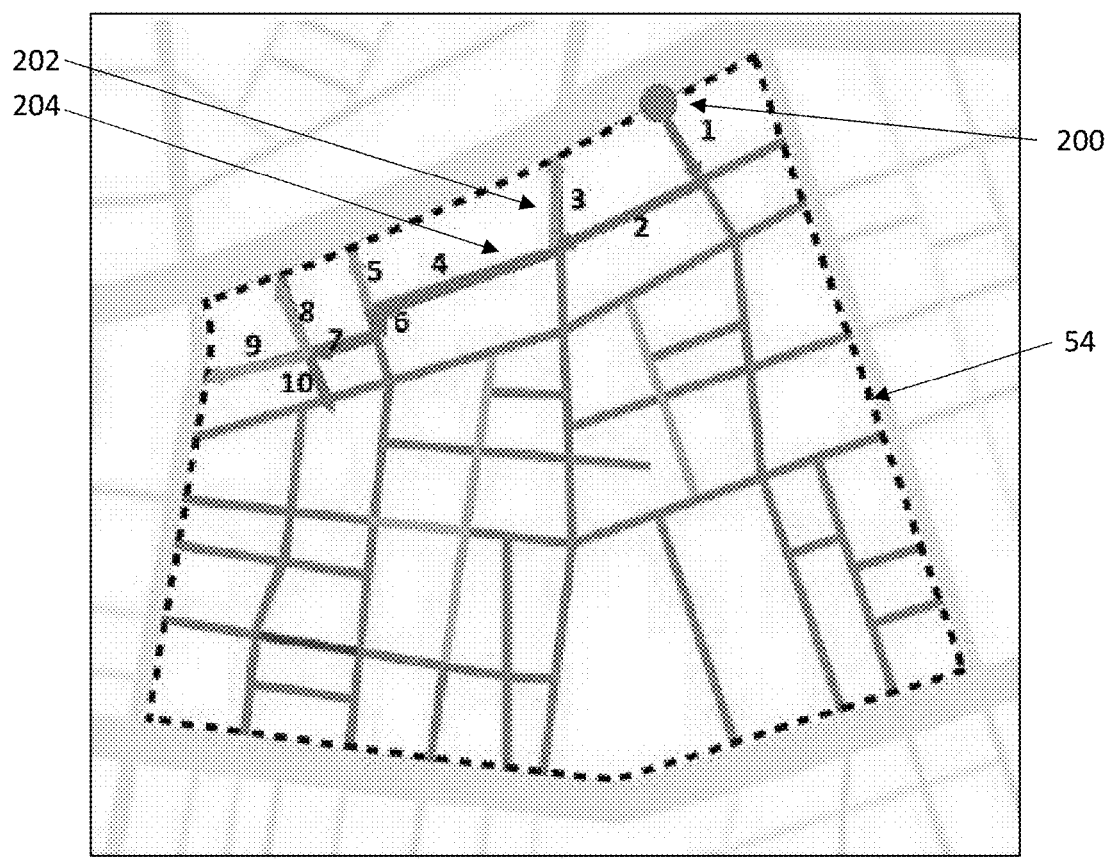
FIG. 35 illustrates an example for identifying the largest inner tour in a subgraph.
Figure 36:
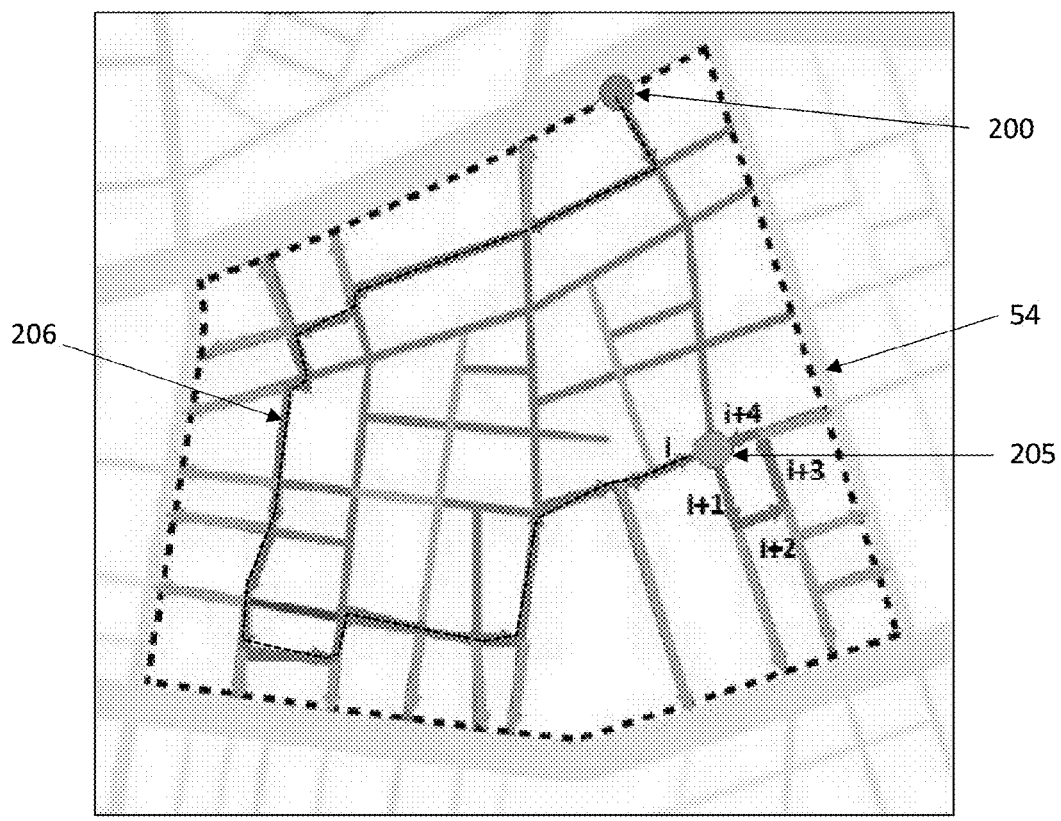
FIG. 36 illustrates an example for identifying the largest inner tour in a subgraph, which example began with reference to FIG. 35.
Figure 37:
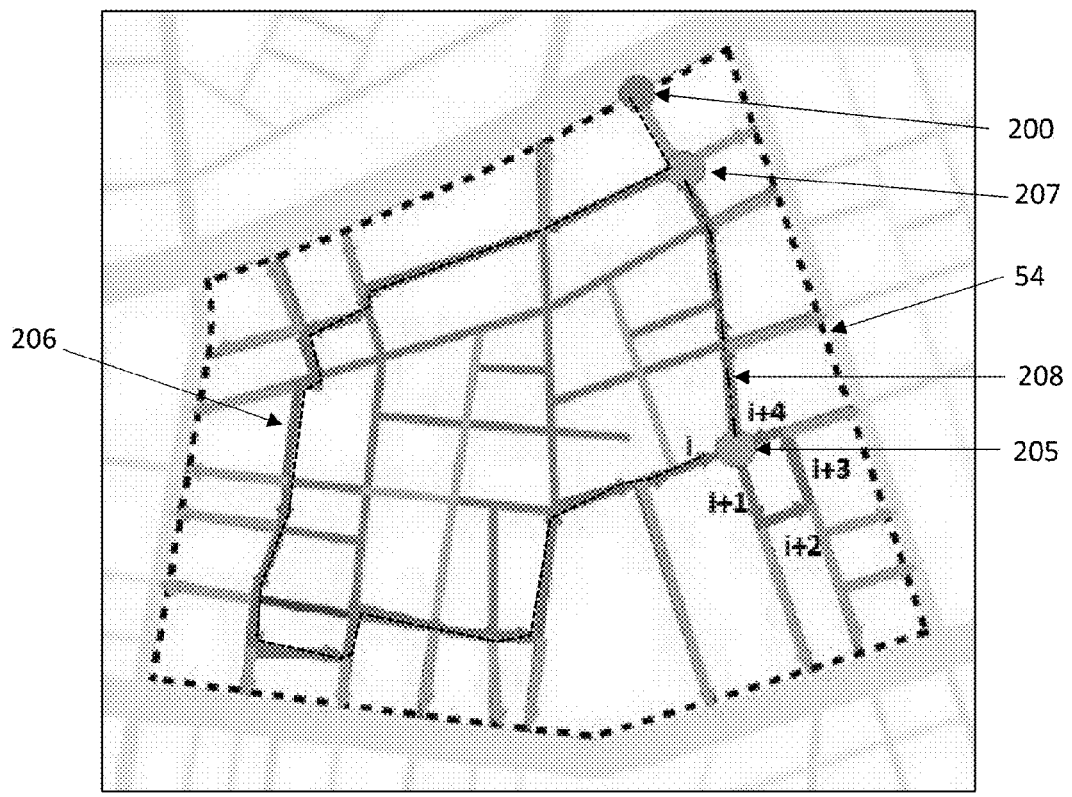
FIG. 37 illustrates an example for identifying the largest inner tour in a subgraph, which example began with reference to FIGS. 35 and 36.

To keep only the best pedestrian tour zones in the second step, the thresholds ($Dist_{Min}$, $A_{min}$, $Dens_{Min}$, $Alt_{Min}$, and $S_{Min}$) can be adjusted according to the characteristics of all the candidate pedestrian tour zones found in the first step (e.g., using the median values of all candidate zones).

g.3: Identification of the Largest Inner Tour:

FIGS. 35-37 illustrate an example for identifying the largest inner tour in a subgraph.

With reference to FIG. 35, to identify the largest inner tour in subgraph 54, the method may start for example from node 200 of the subgraph 54 that is located the most in the north. This ensures that this node is either on the largest inner tour or on a dead end leading outside of this largest inner tour. Then the method explores depth: first the edges leaving this node in a given order (e.g., counterclockwise), and continue recursively at each sub sequent node reached. If an edge leads to a dead end (e.g., the 3rd edge 202 explored in the example), the method backtracks, and the next edge is tried (the 4th edge 204). The exploration process is shown in gray and light red. The order of exploration is indicated by numbers on the explored edges. The dead ends involving backtracking are highlighted in light red (the 3rd, 5th, 8th, and 9th edges). The 1st, 2nd, 4th, 6th, 7th, and 10th explored edges considered as possibly belonging to the largest inner tour are shown in gray.

With reference to FIG. 36, whenever a node is crossed a second time during the exploration, this represents either the completion of the largest inner tour or a node representing a single connection between two subgraphs. The light red intersection on the left corresponds to such a connection (i.e., node 205). Node 205 links the small subgraph represented by the edges i+1, i+2, i+3, and i+4 to the rest of the subgraph 206 to the left of node 205.

With reference to FIG. 37, the exploration continues until an already explored edge is found. This is the case after reaching the second light red node 207. The next edge to explore would be the same edge where the search for the largest inner tour started at node 200. This means that the largest inner tour has been identified: it corresponds to the edges shown in gray (i.e., the subgraph 206, the subgraph with edges i+1, i+2, i+3, and i+4, and the subgraph with edges 208).

3. General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art and are also intended to be encompassed by the following claims.

What is claimed is:

1. An apparatus for navigating a pedestrian tour in a selected geographical zone on a geographic map, comprising:
   a processor circuit;
   a memory, communicating with said processor circuit, for storing a preset target distance for the pedestrian tour;
   a screen communicating with said processor circuit, said processor circuit causing a plurality of user interface elements, representative of (1) portions of the selected geographical zone and (2) pedestrian user progress, to be displayed on the screen with the user interface elements representative of portions of the selected geographic zone being displayed on said screen with a first user interface at a first time and the user interface elements representative of pedestrian user progress being displayed on said screen with a second user interface at a second time;

wherein the plurality of user interface elements representative of the portions of the selected geographical zone respectively represent a starting point, a first pedestrian tour zone, a second pedestrian tour zone and a series of connecting paths, and wherein the series of connecting paths is displayed on said screen as connecting all of the starting point, the first pedestrian tour zone and the second pedestrian tour zone into the pedestrian tour;

wherein said processor circuit is used to store first and second suggested travel constraints in said memory with the first suggested travel constraint corresponding with the first pedestrian tour zone and the second suggested travel constraint corresponding with the second pedestrian tour zone;

wherein the plurality of user interface elements representative of the pedestrian user progress respectively represent progress towards the first suggested travel constraint associated with the first pedestrian tour zone and progress towards the second suggested travel constraint associated with the second pedestrian tour zone;

a navigation module, communicating with said processor circuit, for assessing an extent to which a pedestrian user has executed the pedestrian tour within the first pedestrian tour zone; and wherein, (a) responsive to said navigation module determining that the pedestrian's actual travel within the first pedestrian tour zone will vary from the first suggested travel constraint, said processor circuit dynamically revises the plurality of user interface elements of (1) the selected geographical zone and (2) the pedestrian user progress representative of the second suggested travel constraint for permitting the pedestrian user to execute the pedestrian tour in accordance with a preset target travel constraint for the pedestrian tour, and (b) the navigation module includes a flexible navigation guidance system including a turn-by-turn navigation guidance system for providing a pedestrian user with turn-by-turn directions, and (c) the navigated module turns the turn-by-turn navigation guidance system (i) on when the pedestrian user exits one of first and second pedestrian tour zones and (ii) off when the pedestrian user is within the first and second pedestrian tour zones unless requested by the pedestrian user that the turn-by-turn navigation guidance system be activated.

2. The apparatus of claim 1, wherein the travel constraint comprises one of distance and time.

3. The apparatus of claim 1, in which the variation includes exceeding the first suggested travel constraint, wherein said dynamic revising includes dynamically decreasing the second suggested travel constraint after said navigation module determines that the pedestrian user's actual travel will exceed the first suggested travel constraint; said processor causing a visible change to the pedestrian user progress to indicate both an increase in the first suggested travel constraint and a decrease in the second suggested travel constraint.

4. The apparatus of claim 1, in which the variation includes leaving the first pedestrian tour zone before reaching the first suggested travel constraint, wherein said dynamic revising includes dynamically increasing the second suggested travel constraint.

5. The apparatus of claim 1, wherein, as the dynamically revised second suggested travel constraint approaches a selected value, the pedestrian is warned that the user interface element representative of second pedestrian tour zone will be eliminated from said screen when the revised second suggested travel constraint falls below the selected value.

6. The apparatus of claim 5, in which the revised second suggested travel constraint drops below the selected value, wherein the second pedestrian tour zone is eliminated from the pedestrian tour.

7. The apparatus of claim 6, in which, prior to the pedestrian user touring in the first or second pedestrian tour zone, each of the user interface elements representative of the first and second pedestrian tour zones is displayed on said screen in a first color, wherein, when the revised second suggested travel constraint drops below the selected value, the color of the user interface element representative of the second pedestrian tour zone changes to a second color to indicate that the second pedestrian tour zone has been eliminated from the pedestrian tour.

8. The apparatus of claim 1, in which, prior to the pedestrian user touring the first pedestrian tour zone, the user interface element representative of the first pedestrian tour zone is displayed on said screen in a first color, wherein, as the pedestrian user tours the first pedestrian tour zone, the first color changes, in appearance on the screen, to a second color to indicate an extent to which the pedestrian user has toured the first pedestrian tour zone.

9. The apparatus of claim 1, wherein (a) the plurality of user interface elements representative of the portions of the selected geographical zone includes user interface elements representative of a third pedestrian tour zone and the pedestrian user progresss towards a third suggested travel constraint associated with the third pedestrian tour zone, (b) the series of paths is displayed on said screen as connecting all of the starting point, the first pedestrian tour zone, the second pedestrian tour zone and the third pedestrian tour zone into the pedestrian tour, and (c) when the travel constraint of the first pedestrian tour zone exceeds a selected value, one of the second and third pedestrian tour zones is eliminated from the pedestrian tour.

10. The apparatus of claim 9, wherein said processor circuit is used to store a third suggested travel constraint in said memory with the third suggested travel constraint corresponding with the third pedestrian tour zone, and wherein, responsive to eliminating one of the second and third pedestrian tour zones from the pedestrian tour zone, at least some of the second travel constraint is distributed to the third pedestrian tour zone or at least some of the third travel constraint is distributed to the second pedestrian tour zone.

11. The apparatus of claim 9, wherein said processor circuit is used to store a third suggested travel constraint in said memory with the third suggested travel constraint corresponding with the third pedestrian tour zone, and wherein, responsive to said navigation module determining that the pedestrian's actual travel within the first pedestrian tour zone will vary from the first suggested travel constraint, said processor circuit dynamically revises both the first and second suggested travel constraints.

12. The apparatus of claim 9, in which the selected value comprises a first selected value, wherein when the first travel constraint exceeds a second selected value, the pedestrian user is directed, by way of a message from the apparatus, to return to the starting point.

13. The apparatus of claim 9, wherein respective priorities are assigned to the second and third pedestrian tour zones with the priority of the third pedestrian zone being greater than the priority of the second pedestrian zone, and wherein, responsive to both the priority of the third pedestrian tour zone being greater than the priority of the second pedestrian tour zone and the travel constraint of the first pedestrian zone exceeding the selected value, the second pedestrian tour zone is eliminated from the pedestrian tour.

14. The apparatus of claim 9, in which (1) each one of the user interface elements representative of the first, second and third pedestrian tour zones is displayed as having a first color and (2) each one of the user interface elements is displayed on a background having a second color, wherein, when the second pedestrian tour zone is eliminated from the pedestrian tour, the user interface element representative of the second pedestrian tour zone changes from the first color to a third color with the third color being in contrast with respect to the second color so that an outline of the eliminated second pedestrian tour zone is visible on said screen.

15. The apparatus of claim 9, wherein the third pedestrian tour zone is added to the pedestrian tour in response to a request from the pedestrian to change the pedestrian tour.

16. The apparatus of claim 9, wherein, responsive to the second pedestrian tour zone being eliminated from the pedestrian tour, the user interface element representative of the series of connecting paths displayed on said screen is remapped by said processor circuit so that the series of connecting paths connects all of the starting point, the first pedestrian tour zone and the third pedestrian tour zone, but not the second pedestrian tour zone.

17. The apparatus of 1, wherein, responsive to a request by the pedestrian user, one of the first and second travel constraints is increased or decreased in value.

18. The apparatus of claim 1, wherein the pedestrian user is walking or running in the pedestrian tour zone.

19. The apparatus of claim 1, wherein selected feedback regarding the pedestrian user's progress relative to executing the pedestrian tour is provided to the pedestrian user with the apparatus.

20. The apparatus of claim 19, wherein the selected feedback is provided by way of a visual representation on said screen.

21. The apparatus of claim 19, wherein the feedback comprises audio or haptic feedback.

22. The apparatus of claim 3, wherein the plurality of user interface elements representative of pedestrian user progress towards the first suggested travel constraint associated with the first pedestrian tour zone and progress towards the second suggested travel constraint associated with the second pedestrian tour zone is shown using a first bar segment and a second bar segment, respectively, within a bar displayed on the screen with the second user interface to indicated overall progress.

23. The apparatus of claim 22, wherein the second bar segment serves to apprise the pedestrian user that the second pedestrian tour zone will be eliminated from the pedestrian tour if the pedestrian user continues to exceed the first suggested travel constrain.

24. The apparatus of claim 23, in which the second bar segment is displayed in a selected color to indicate that the second pedestrian tour zone is being eliminated from the pedestrian tour.

25. The apparatus of claim 22, in which the second pedestrian tour zone is eliminated, wherein responsive to the second pedestrian tour zone being eliminated, the second bar segment is no longer displayed on the bar.

26. The apparatus of claim 22, in which the bar comprises a first bar, wherein said processor circuit causes a message, indicating that the second pedestrian tour zone is being eliminated, to be displayed on said screen at a location adjacent to a second bar with the second bar being spaced on the second user interface from the first bar.

27. The apparatus of claim 26, wherein, prior to the second pedestrian tour zone being eliminated, at least a portion of the second bar changes from a first color to a second color.

* * * * *